(12) United States Patent
Tada et al.

(10) Patent No.: US 9,632,543 B2
(45) Date of Patent: Apr. 25, 2017

(54) MOBILE DEVICE

(71) Applicant: Rohm Co., Ltd., Kyoto (JP)

(72) Inventors: Yoshihiro Tada, Kyoto (JP); Yuichiro Nakata, Kyoto (JP); Junji Fujino, Kyoto (JP); Yoshitsugu Uedaira, Kyoto (JP); Nobuyuki Yamada, Kyoto (JP); Takeshi Yoshida, Kyoto (JP); Masahide Tanaka, Osaka (JP)

(73) Assignee: Rohm Co., Ltd., Kyoto (JP)

( * ) Notice: Subject to any disclaimer, the term of this patent is extended or adjusted under 35 U.S.C. 154(b) by 58 days.

(21) Appl. No.: 14/557,928

(22) Filed: Dec. 2, 2014

(65) Prior Publication Data

US 2015/0084904 A1 Mar. 26, 2015

Related U.S. Application Data

(63) Continuation of application No. 13/502,173, filed as application No. PCT/JP2010/068175 on Oct. 15, 2010, now abandoned.

(30) Foreign Application Priority Data

Oct. 16, 2009 (JP) ................ 2009-239166
Oct. 21, 2009 (JP) ................ 2009-242039
Oct. 26, 2009 (JP) ................ 2009-245535

(51) Int. Cl.
*G06F 3/041* (2006.01)
*G06F 1/16* (2006.01)
(Continued)

(52) U.S. Cl.
CPC .......... *G06F 1/1694* (2013.01); *G06F 1/1643* (2013.01); *G06F 1/1686* (2013.01);
(Continued)

(58) Field of Classification Search
CPC .... G06F 1/1643; G06F 1/1686; G06F 1/1694; G06F 1/3206; G06F 1/3231;
(Continued)

(56) References Cited

U.S. PATENT DOCUMENTS

2003/0006973 A1 1/2003 Omura et al.
2005/0164633 A1 7/2005 Linjama et al.
(Continued)

FOREIGN PATENT DOCUMENTS

JP 2001-352395 12/2001
JP 2005-275867 10/2005
(Continued)

OTHER PUBLICATIONS

International Search Report for Application No. PCT/JP2010/068175 dated Jan. 11, 2011.
(Continued)

*Primary Examiner* — Kumar Patel
*Assistant Examiner* — Insa Sadio
(74) *Attorney, Agent, or Firm* — Fish & Richardson P.C.

(57) ABSTRACT

Disclosed is a mobile device comprising an acceleration detection unit for detecting acceleration relative to the device; a condition identification unit; and a power supply controller which determines, from a combination of the output of the acceleration detection unit and the output of the condition identification unit, whether or not to begin to supply power to the device.

15 Claims, 19 Drawing Sheets

(51) Int. Cl.
*G06F 1/32* (2006.01)
*G06F 3/03* (2006.01)
*G06F 3/0346* (2013.01)
*H04W 52/02* (2009.01)

(52) U.S. Cl.
CPC .......... *G06F 1/3206* (2013.01); *G06F 1/3231* (2013.01); *G06F 3/0325* (2013.01); *G06F 3/0346* (2013.01); *G06F 3/041* (2013.01); *H04W 52/0254* (2013.01); *G06F 2203/0381* (2013.01); *Y02B 60/1289* (2013.01)

(58) Field of Classification Search
CPC .......... G06F 2203/0381; G06F 3/0325; G06F 3/0346; G06F 3/041; H04W 52/0254; Y02B 60/1289
See application file for complete search history.

(56) References Cited

U.S. PATENT DOCUMENTS

| | | |
|---|---|---|
| 2006/0240875 A1 | 10/2006 | Miyazawa |
| 2008/0058032 A1 | 3/2008 | Yamaji et al. |
| 2008/0165154 A1* | 7/2008 | Kim ................ G06F 3/0488 345/173 |
| 2010/0017758 A1* | 1/2010 | Zotov ................ G06F 3/0418 715/863 |
| 2010/0070926 A1* | 3/2010 | Abanami ............. G06F 1/1626 715/835 |
| 2010/0125816 A1* | 5/2010 | Bezos ................ G06F 1/1626 715/863 |
| 2010/0144447 A1* | 6/2010 | Nonaka ................ A63F 13/06 463/43 |
| 2011/0053570 A1 | 3/2011 | Song et al. |
| 2011/0074945 A1 | 3/2011 | Watanabe et al. |
| 2011/0190038 A1 | 8/2011 | Nakano |

FOREIGN PATENT DOCUMENTS

| | | |
|---|---|---|
| JP | 2007-280461 | 10/2007 |
| JP | 101504791 | 8/2009 |
| JP | 2013-15609 Y | 9/2009 |

OTHER PUBLICATIONS

Intellectual Property Office of China, Official communication dated in patent application No. 201080056604.8 , 1 page (Dec. 17, 2013).

* cited by examiner

MOBILE DEVICE

TECHNICAL FIELD

The present invention relates to a mobile device.

BACKGROUND ART

There have been various proposals made for mobile devices intended to render them easier to use. For example, Japanese Laid-open Patent Publication No. 2007-280461 (Patent Document 1) proposes a configuration such that a cellular content player is equipped with an acceleration sensor and the angle of incline of an axis of the content player is detected, whereby list-scrolling is performed and a cursor on a list is moved and scrolled in accordance with the detection results. The use of graphical user interfaces (GUI) as an input apparatus for mobile devices has also become increasingly popular. An example thereof is the use of a touch panel on a display unit.

LIST OF CITATIONS

Patent Literature

Patent Document: Japanese Laid-open Patent Publication 2007-280461

SUMMARY OF INVENTION

Technical Problem

However, mobile devices have many problems yet to be resolved in order to be made easier to use.

The present invention has been contrived in view of the aforesaid problems as discovered by the present inventors, and provides a user-friendly mobile device.

Solution to Problem

To achieve the aforesaid objective, a mobile device according to the present invention is configured comprising: an acceleration detection unit for detecting acceleration relative to device; a condition identification unit; and a power supply controller for deciding whether or not to begin to supply power to the device according to a combination of an output of the acceleration detection unit and an output of the condition identification unit (a first aspect).

The mobile device comprising the first aspect may also be configured such that the condition identification unit has a state identification unit for identifying a first state and a second state, wherein the power supply controller begins supplying power to the device when the acceleration detection unit has detected acceleration and the state identification unit has identified the first state, and does not begin supplying power to the device when the state identification unit has identified the second state, even when the acceleration detection unit has detected acceleration (a second aspect).

The mobile device comprising the second aspect may also be configured so that the state identification unit has a light-emitting unit and a light-receiving unit capable of receiving reflected light of the light of the light-emitting unit, and identifies the first state and the second state in accordance with a light-receiving state of the light-receiving unit (a third aspect).

The mobile device comprising the first aspect may also be configured such that the condition identification unit has a contactless input unit operating by detecting movement around the device using a light-emitting unit and a light-receiving unit capable of receiving reflected light of the light of the light-emitting unit, and the power supply controller decides whether or not to begin supplying power to the device according to a combination of an output of the light-receiving unit with the acceleration detection of the acceleration detection unit (a fourth aspect).

The mobile device comprising the first aspect may also be configured such that the condition identification unit identifies whether or not the acceleration detected by the acceleration detection unit conforms to a predetermined pattern, and the power supply controller begins to supply power to the device when acceleration detected by the acceleration detection unit conforms to the predetermined pattern and does not begin to supply power to the device when, even though the acceleration detection unit has detected the acceleration, the acceleration is not in the predetermined pattern (a fifth aspect).

The mobile device comprising the first aspect may also be configured such that the condition identification unit has a contact detector for detecting contact made with the device by a human body, and the power supply controller begins to supply power to the device when the acceleration detection unit detects acceleration and the contact detector detects the contact of a human body, and does not begin supplying power to the device when the contact detector does not detect the contact of a human body, even when the acceleration detection unit has detected acceleration (a sixth aspect).

The mobile device comprising the first aspect may also be configured comprising: a display screen; and input means for inputting on the basis of the display of the display screen and on the basis of the gravitational acceleration detected by the acceleration detection unit (a seventh aspect).

The mobile device comprising the first aspect may also be configured comprising: a display screen; a display controller for causing the display screen to display different instructions for input on the display screen; and a determination unit for determining whether there has been made, on the display screen, an input based on the instruction displayed on the display screen (an eighth aspect).

A mobile device according to the present invention is configured comprising: an acceleration detection unit for detecting acceleration relative to the device; a display screen; and input means for inputting on the basis of the display of the display screen and on the basis of the gravitation acceleration detected by the acceleration detection unit (a ninth aspect).

The mobile device comprising the ninth aspect may also be configured comprising a movement detector for detecting the movement of a hand being moved on the display screen, wherein the input means inputs on the basis of the movement detection made by the movement detector and on the basis of the acceleration detection made by the acceleration detection unit (a tenth aspect).

The mobile device comprising the tenth aspect may also be configured such that: the display screen is rectangular, having long sides and short sides; the input means detects, on the basis of the detection made by the acceleration detection unit, whether the mobile device is in a posture in either of a position such that the display screen is horizontal or a position such that the display screen is vertical, and the input means inputs a like associated meaning on the basis of the movement of a hand in a like direction, irrespective of the posture of the display screen, on the basis of the detection results (an eleventh aspect).

The mobile device comprising the ninth aspect may also be configured further comprising updating means for updating a reference value of gravitation acceleration detection necessary for input (a twelfth aspect).

The mobile device comprising the ninth aspect may also be configured further comprising an infrared-light-emitting unit, and an infrared-light-receiving unit for receiving infrared light from the infrared-light-emitting unit reflected from a hand moving on the display screen, wherein the input means inputs a first associated meaning in relation to the display screen on the basis of information from the acceleration detection unit, and also inputs a second associated meaning in relation to the display screen on the basis of information from the infrared-light-receiving unit (a thirteenth aspect).

The mobile device comprising the ninth aspect may also be configured further comprising an infrared-light-emitting unit, and an infrared-light-receiving unit for receiving the infrared light from the infrared-light-emitting unit reflected from a hand moving on the display screen, wherein the input means inputs a like associated meaning in relation to the display screen irrespective of whether there is information from the acceleration detection unit or information from the infrared-light-receiving unit (a fourteenth aspect).

A mobile device according to the present invention is configured comprising: a display screen; a display controller for causing the display screen to display different instructions for input on the display screen; and a determination unit for determining whether there has been made, on the display screen, an input based on an instruction displayed on the display screen (a fifteenth aspect).

The mobile device comprising the fifteenth aspect may also be configured further comprising a movement detector for detecting the movement of a hand being moved on the display screen, wherein the display controller causes the display screen to display a instruction to move a hand that is to be moved on the display screen, and the determination unit determines whether or not the movement detector has detected a movement corresponding to the instruction that has been displayed on the display screen (a sixteenth aspect).

The mobile device comprising the fifteenth aspect may also be configured such that the display controller causes the display screen to display different instructions in the case of a right hand operation and in the case of a left hand operation for the input of a like meaning on the display screen (a seventeenth aspect).

The mobile device comprising the fifteenth aspect may also be configured further comprising a movement detector for detecting the movement of a hand being moved on the display screen, and an input unit for inputting a like meaning on the basis of an output of the movement detector, which is different in the case of a right hand operation and in the case of a left hand operation (an eighteenth aspect).

The mobile device comprising the fifteenth aspect may also be configured further comprising a movement detector for detecting the movement of a hand being moved on the display screen, wherein the determination unit determines that detection results of the movement detector are the input of a like meaning on the basis of different determination criteria in the case of a right hand operation and the case of a left hand operation (a nineteenth aspect).

The mobile device comprising the fifteenth aspect may also be configured comprising: an input unit; a camera unit for capturing an image in the direction opposite to the display screen; a facial recognition unit for processing an image from the camera unit and recognizing a face; and a controller for performing an input using the input unit whenever a face opposite to the display screen is recognized by the facial recognition unit (a twentieth aspect).

Advantageous Effects of the Invention

According to the present invention, it is possible to provide a user-friendly mobile device.

BRIEF DESCRIPTION OF THE DRAWINGS

FIG. 5 is an external view of when the mobile device of the aforesaid embodiment is held horizontally, where

MODES FOR CARRYING OUT THE INVENTION

Figure 1:
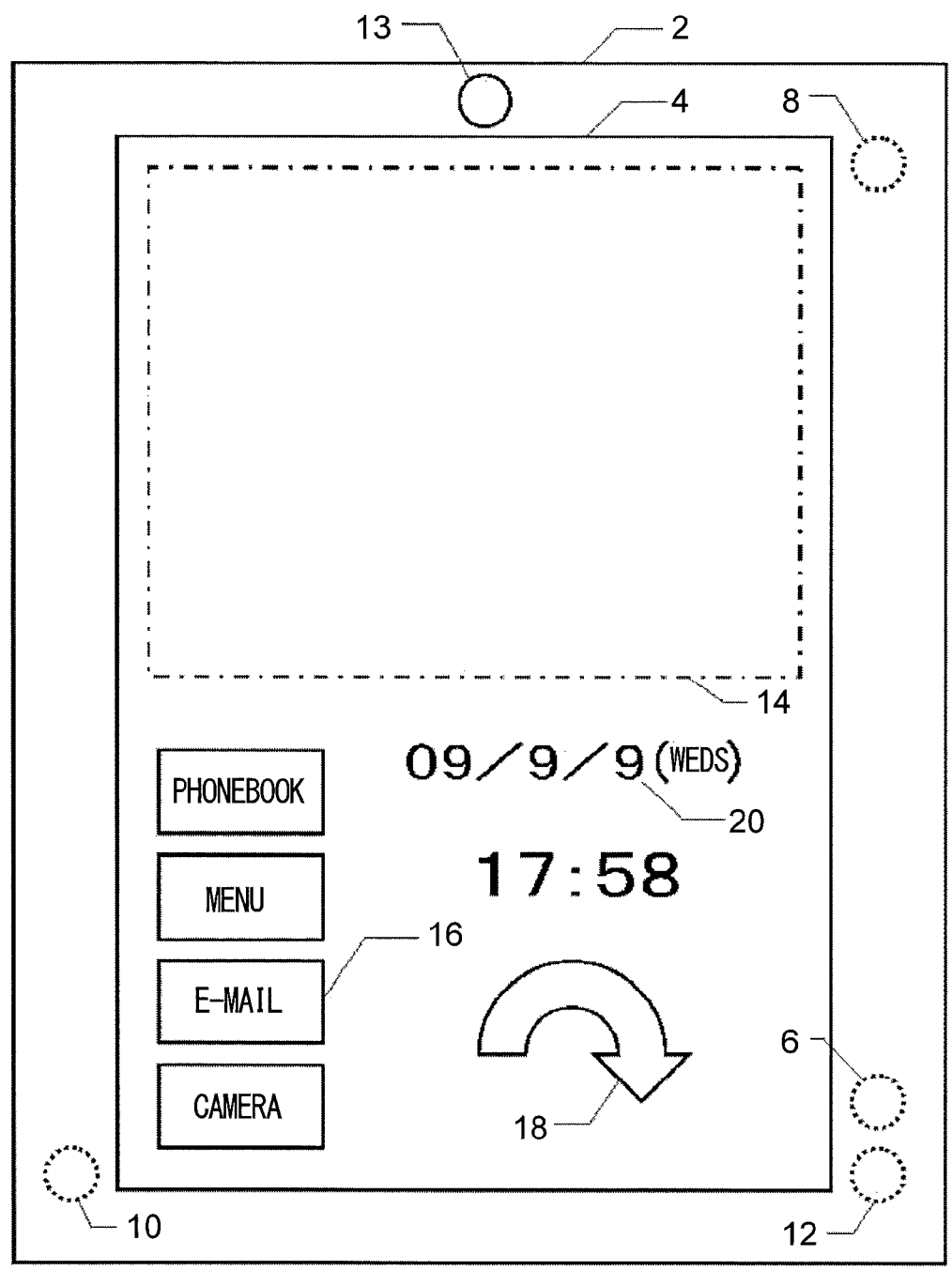
FIG. 1 is a top external view of the use of a right hand operation in an embodiment of a mobile device according to an aspect of the present invention.

FIG. 1 is a top external view in an embodiment of a mobile device according to an aspect of the present invention. The embodiment is configured as a cellular telephone 2; the greater part of the surface area on the top surface thereof is occupied by a display unit 4 doubling as an input unit. The display unit 4 is illuminated by a back light. The periphery of the display unit 4 is provided on the lower right side with an infrared-beam-receiving sensor 6 composed of a photodiode, and is provided also on the upper right side and lower left and right sides with infrared-beam-emitting units 8, 10, and 12, each composed of an LED. Each of the infrared-beam-receiving sensor 6 and the infrared-beam-emitting units 8, 10, 12 is covered by an infrared-transmissive cover provided to the periphery of the display unit 4, and is therefore intentionally invisible from the outside Infrared light, which is emitted in discrete divisions of time from the infrared-beam-emitting units 8, 10, 12, is reflected by a finger or hand of an operator being moved on the display unit 4 in relation to the display. The reflected light is then received by the infrared-beam-receiving sensor 6, whereby the location of the finger or hand of the operator and the presence or absence of a movement and the directionality thereof are detected, the detection then being inputted to the cellular telephone 2.

The absolute magnitude of the output of the infrared-beam-emitting unit 12, which is provided in proximity to the infrared beam light-receiving unit 6, serves primarily as information on the proximity of a hand or finger. On the other hand, the relative difference between the output changes of the infrared-beam-emitting units 8, 12, which are aligned in the vertical direction, serves primarily as information on the vertical movement of the hand or finger, while the relative difference between the output changes of the infrared-beam-emitting units 10, 12, which are aligned in the horizontal direction, serves primarily as information on the horizontal movement of the hand or finger. The relative difference between the output changes of the infrared-beam-emitting units 8, 10, which are on a diagonal line, also serves as information on the horizontal movement of the hand or finger. In practice, however, such a clear distinction as described above is not made for the information of the infrared-beam-receiving sensor 6, which is based on the emitted light of the infrared-beam-emitting units 8, 10, 12; rather, a comprehensive analysis and determination are made. The cellular telephone 2 is also provided with an acceleration sensor, and the tilt, vibration, shaking and other parameters of the cellular telephone 2 detected by the acceleration sensor serve as input to the cellular telephone 2. The input to the cellular telephone 2 shall be described in greater detail below.

The cellular telephone 2 has a rectangular shape, as in FIG. 1, and ordinarily is used while being held in a single hand in a vertical state as in FIG. 1. It is assumed in this configuration that the operation to use the infrared-beam-receiving sensor 6 and the infrared-beam-emitting units 8, 10, 12 for input is primarily performed by the movement of the thumb of the one hand holding the cellular telephone 2 in such a vertical state. The display on the display unit 4 in FIG. 1 is an initial screen, such as a standby screen for a state in which power to the cellular telephone 2 has been switched on; however, the display related to the input operation in the layout of this state is arranged to focus on the range within the natural reach of the thumb of the one hand holding the cellular telephone 2, an upper region 14 of the display unit 4 being assigned primarily to displaying an image, text, or other information. The configuration is further such that respective support can be provided for a single-hand operation in both a case where the cellular telephone 2 is held with the right hand and a case where the cellular telephone 2 is held with the left hand. FIG. 1 is the display in a case where the cellular telephone is held with the right hand.

An internal camera 13 is capable of photographing the face of an operator who is viewing the display unit 4 in a case where the cellular telephone 2 is being used as a video telephone, and is also used for taking a self-portrait. The cellular telephone 2 is configured so as to be capable of performing facial recognition on images from the inward-facing camera 13, and is configured such that, whenever the face of the operator who is viewing the display unit 4 cannot be detected by the facial recognition function, no input operation can be performed even when the infrared-beam-receiving sensor 6 and the infrared-beam-emitting units 8, 10, 12 have detected the movement of an object on the display surface 4. It is thereby possible to prevent mistaken operation in a case where a hand or the like is unintentionally passed over the display surface 4 when no operation is intended. The combination of such facial recognition information by the inward-facing camera 13 with the detection of the tilt, vibration, or shaking of the cellular telephone 2 by the acceleration sensor also makes it possible to prevent a mistaken operation by the output of the acceleration sensor.

Figure 2:
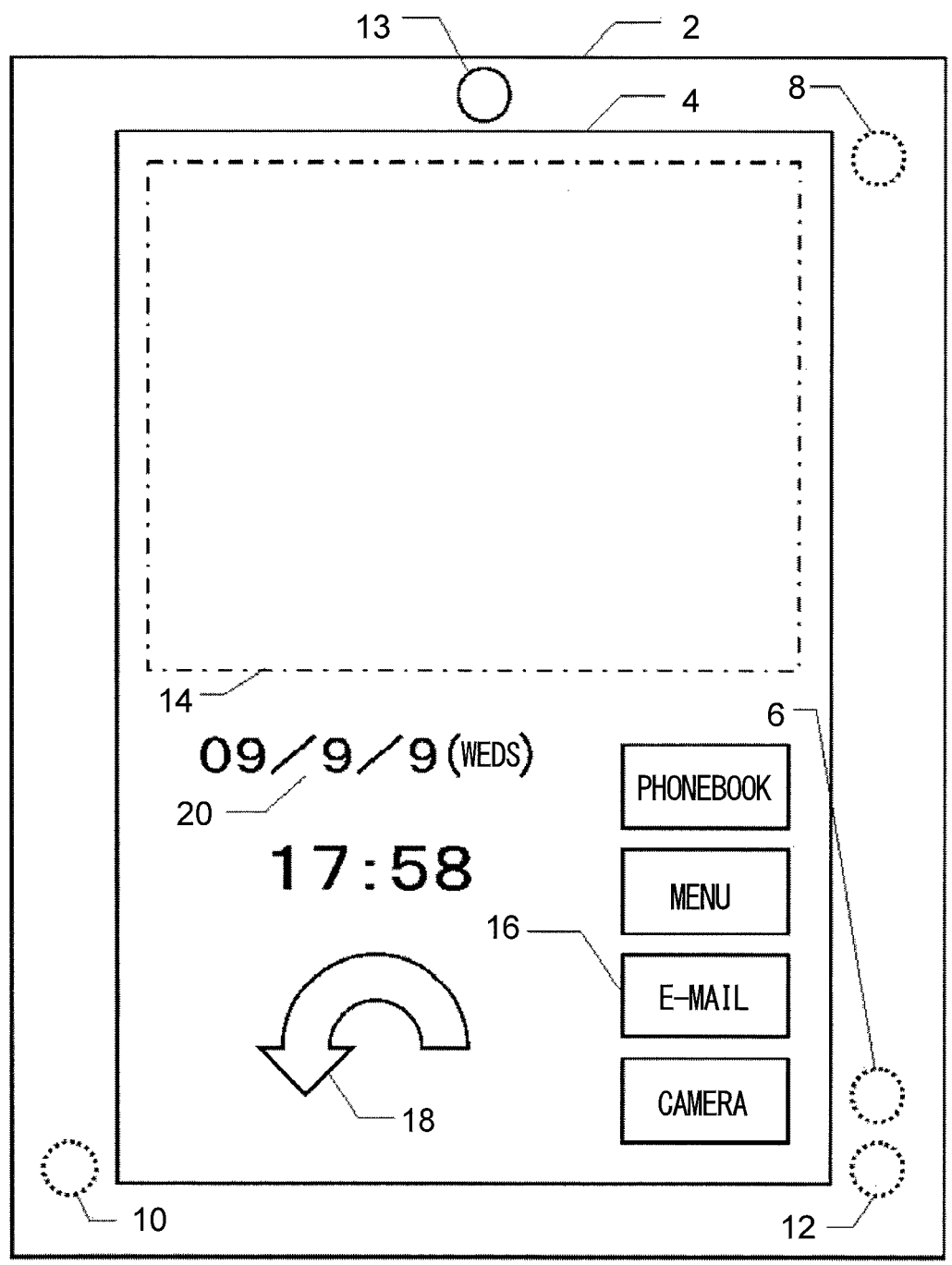
FIG. 2 is a top external view of the use of a left hand operation in the aforesaid embodiment.

FIG. 2 is a top external view in the same embodiment of the mobile device appearing in FIG. 1, but is of the display in a case where the cellular telephone 2 is held in the left hand. In such a case, the display of the lower region of the display unit 4 as illustrated in FIG. 2 is substituted in a bilaterally symmetric manner related to that of FIG. 1, the display being changed such that input is performed in accordance with the movement of the left hand thumb in mirror symmetry with the movement of the right hand thumb. In correspondence with such changes in the display, a criteria table for deciding on the movement of a thumb is also changed from right hand use to left hand use. Further, in tandem with the aforesaid changes to the criteria table, the intensity of the light emitted by the infrared-beam-emitting units 8, 10, and 12 is also changed for right hand use and left hand use. These changes occur because the arrangement of the infrared-beam-receiving sensor 6 and the infrared-beam-emitting units 8, 10, 12 does not correspond to having left-right symmetry. The changes to the display between FIGS. 1 and 2 and the accompanying changes to the criteria table are performed automatically when the pattern of initial movement of a finger on the display unit 4 is identified and a determination is made as to whether the movement is specific to the right hand thumb or the movement is specific to the left hand thumb. Accordingly, the displays and criteria tables are fundamentally switched automatically whenever the holding hand is switched between the left and right hands and thumb operation is begun, as well as during the initial phase thereof, even when there has been no manual switching operation. Further, being that the right side surface of the cellular telephone 2 is tapped by the right hand thumb in the case of a right hand operation, and the left side surface of the cellular telephone 2 is tapped by the left hand thumb in the case of a left hand operation, the acceleration sensor determines which of the side surfaces has been tapped; therefore, it is also possible to switch manually.

In FIGS. 1 and 2, the display in the lower region of the display unit 4 relating to input operations is, firstly, a basic function selection unit 16 composed of a list of menus such as "PHONEBOOK," "MENU," "E-MAIL," and "CAMERA." These menus can be selected through the detection of tilt or vibration by the acceleration sensor and through the detection of the movement of a finger on the basic function selection unit 16 by the infrared-beam-emitting units 8, 10, 12 and the infrared-beam-receiving sensor 6. A more detailed description thereof shall be provided below. An input instruction can be executed by moving the thumb on a "PROCEED" finger trajectory instruction mark 18 in a clockwise motion as instructed thereby; a more detailed description thereof shall also be provided below. A date/time display 20 can be adjusted or changed by performing a predetermined operation procedure and subsequently moving a finger on the display, but normally there will be no response even when a finger is moved over the display rather than over the input unit.

Figure 3:
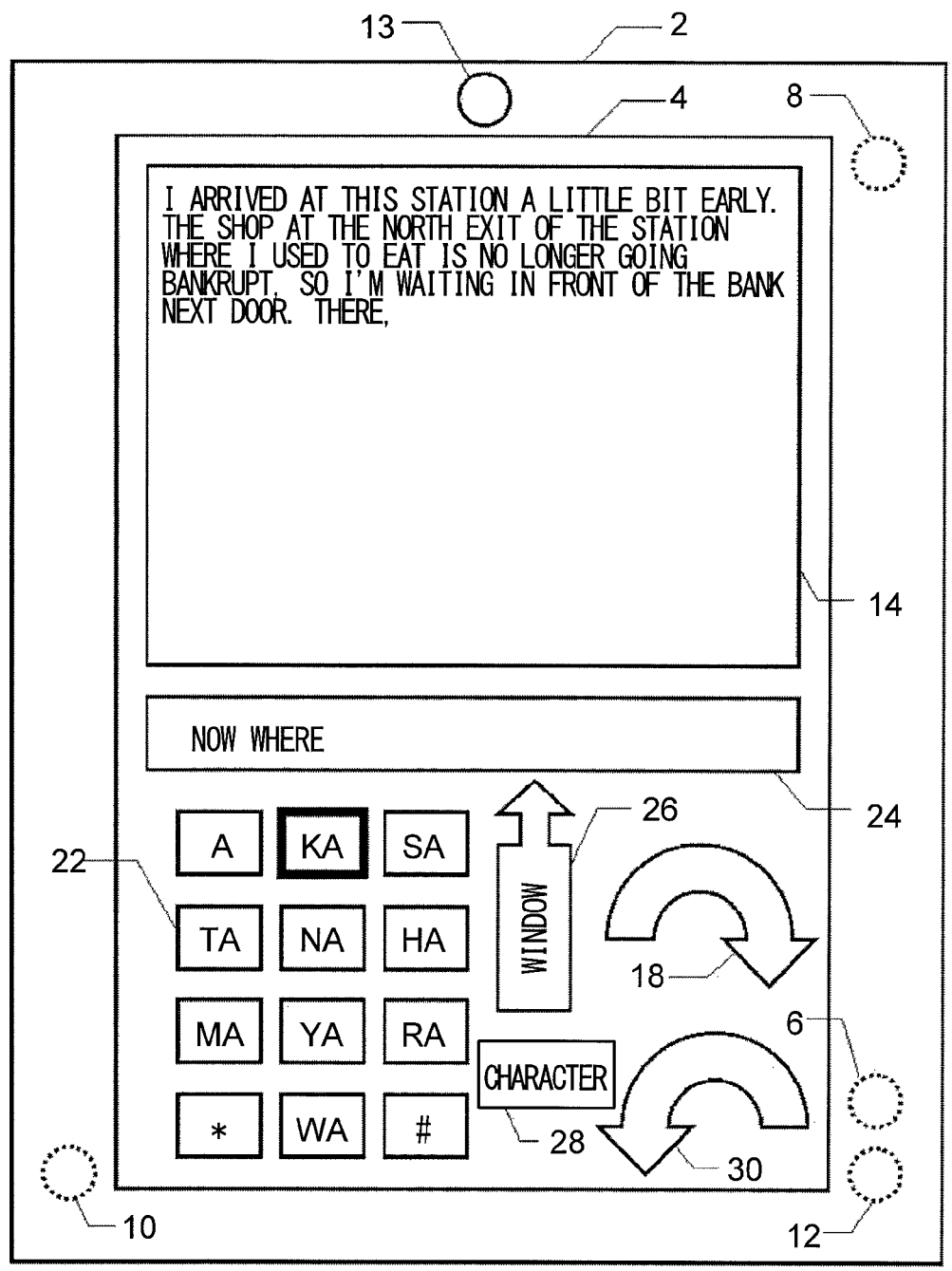
FIG. 3 is a top external view of when an "E-MAIL" selection has been confirmed in the aforesaid embodiment.
Figure 4:
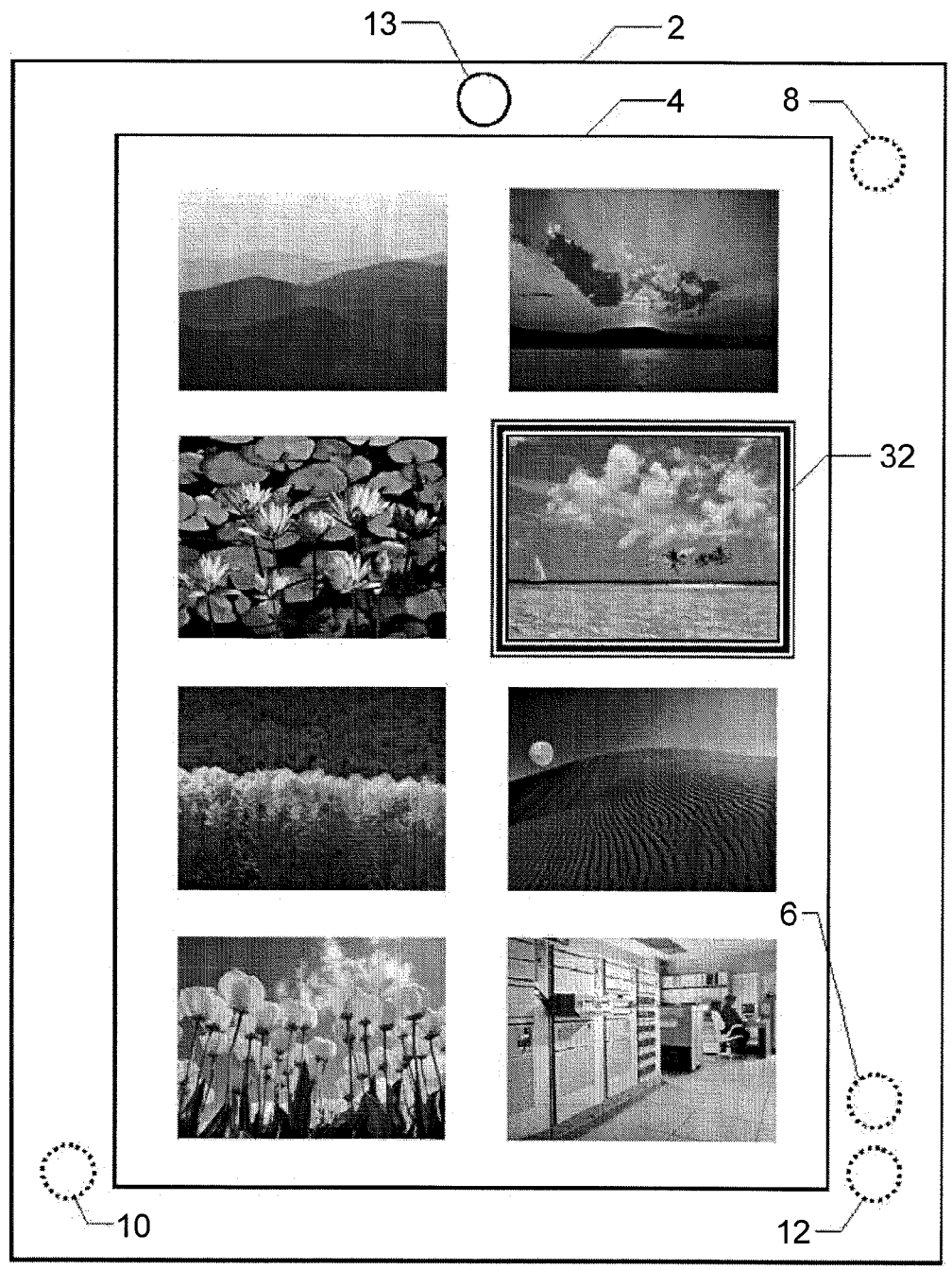
FIG. 4 is a top external view of when a thumbnail display of an image has been selected in the aforesaid embodiment.

FIG. 3 is a top external view of the cellular telephone 2 illustrating a screen which appears when there is confirmation that "E-MAIL" has been selected in the basic function selection unit 16 of FIG. 1. More will be described below regarding the selection of the list of menus in the basic function selection unit 16 and the confirmation operation; FIGS. 3 to 5 provide a description of the display which appears as a result of a confirmed selection. In FIG. 3 and the following drawings, the display, which assumes the single-handed operations in FIGS. 7 to 12, is described with reference to FIG. 1 only with regard to a case where the cellular telephone 2 is held in the right hand, and a description of the case of a left hand operation has been omitted. Such an omission is made because the case where the cellular telephone 2 is held in the left hand may be readily understood as being similar with respect to FIG. 2, the display being fundamentally substituted by left-right symmetry.

In FIG. 3, like constituent elements from FIG. 1 are given like reference numerals, and a description thereof has been omitted. In a case where the e-mail function is selected by an operation procedure described below and the state becomes that of FIG. 3, an input character board 22 is displayed in the lower region of the display unit 4. When characters are to be inputted, each column of Japanese characters "a," "ka," "sa," "ta," "na," etc. is selected by the detection of tilt or vibration by the acceleration sensor or by the detection of the movement of a finger by the infrared-beam-emitting units 8, 10, 12 and the infrared-beam-receiving sensor 6. A thick-framed cursor, as with "ka" in FIG. 3, is displayed on the selected column. Each time the cellular telephone 2 is tapped with the middle finger or the like from the rear side in the state where the cursor is on the "ka" column changes the selected row "ka," "ki," "ku," "ke," and "ko" in the "ka" column, and the result thereof appears as "ko" in the cursor portion of the input window 24.

A Japanese kana-kanji conversion is performed each time the thumb is moved over a window movement trajectory mark 26 along the direction of the arrow, the conversion being confirmed when the cellular telephone 2 is tapped from the rear side, following which the inputted characters are moved from an input window 24 to a display window in the upper region 14 whenever the thumb is again moved over the window movement trajectory mark 26 along the direction of the arrow. Further, conversions to hiragana, katakana, Latin alphanumeric characters and other character systems are made when the right hand thumb is waved a predetermined number of times, the input character board 22 being changed each time this occurs. The "PROCEED" finger trajectory instruction mark 18, which is displayed in both FIGS. 1 and 2, is used for input for advancing the display screen; each time a finger is moved as is instructed, the screen is advanced to a not-yet-inputted screen from among a destination input screen, a title input screen, and a text input screen. At the stage where all screens have been inputted, a transmission is executed when the finger is moved as is instructed. Meanwhile, in FIG. 3, a "GO BACK" finger trajectory instruction mark 30 is also displayed; when the thumb is moved along this instruction in a counterclockwise motion, then inputted characters are cleared, the screen is returned, or another similar operation is executed.

The infrared-beam-emitting units 8, 10, 12 and the infrared-beam-receiving sensor 6 provide coverage not only for the lower region of the display unit 4 but also the upper region 14. Accordingly, inputting can be performed using two-handed operation by the movement of a hand in the upper region 14. For example, in a case where the cellular telephone 2 is being held in the right hand, the right hand thumb is not within reach of the upper region 14 of the display unit 4 in FIG. 3, but the infrared-beam-emitting units 8, 10, 12 and the infrared-beam-receiving sensor 6 sense when the left hand is waved left and right over the upper region 14, whereupon the display window in the upper region 14 jumps a page. Similarly, the infrared-beam-emitting units 8, 10, 12 and the infrared-beam-receiving sensor 6 sense when the left hand is waved up and down over the upper region 14, whereupon the display window in the upper region 14 scrolls.

FIG. 4 is a top external view of the cellular telephone 2 illustrating a screen which appears when a thumbnail display of an image has been selected. Like constituent elements from FIG. 1 are given like reference numerals, and a description thereof has been omitted. In a case where the display becomes that of an image thumbnail, as in FIG. 4, due to an operation procedure described below, the entirety of the display unit 4 is assigned to displaying the thumbnail, rather than being divided into the upper region and the lower region. The designation of a thumbnail can be inputted at such a time by the detection of tilt or vibration by the acceleration sensor and by the detection of the movement of a hand by the infrared-beam-emitting units 8, 10, 12 and the infrared-beam-receiving sensor 6. In the case of input by movement of the hand, for example, the two-handed operation is such that the cellular telephone 2 is held in the left hand and the right hand is moved left/right/up/down. The selected image is displayed with a thick-framed cursor 32, and the thick-framed cursor 32 is moved by an operation to tilt or wave the cellular telephone 2 or by an operation to move the hand over the display unit 4, as described above. Then, when the cellular telephone 2 is tapped with the middle finger or the like from the rear side in the state where the thick-framed cursor 32 is over any one of the images, the selection is confirmed and the relevant image is enlarged and displayed. At such a time, when the image is a horizontal one, the enlarged image is displayed in the upper region 14, and an operation display for single-handed operations appears in the lower region, which is empty.

In the state where one image has been enlarged in this manner, operations to turn the page to one image at a time and to zoom the image are possible. Any of these operations can be performed by the detection of the movement of a hand by the infrared-beam-emitting units 8, 10, 12 and the infrared-beam-receiving sensor 6. Specifically, the page is turned to the next page by the hand being moved in the leftward direction over the single enlarged image being displayed, and the following enlarged image is then displayed. Alternatively, the page is turned back to the preceding page by the hand being moved in the rightward direction over the single enlarged image being displayed, and the preceding enlarged image is then displayed. Next, the image is zoomed in on by the hand being moved in the upward direction over the single enlarged image being displayed, and the image is zoomed out by the hand being moved in the downward direction. When the display is to be returned to the thumbnail display, the "GO BACK" finger trajectory instruction mark 30 displayed in the lower region is traced with the finger.

Figure 5A:
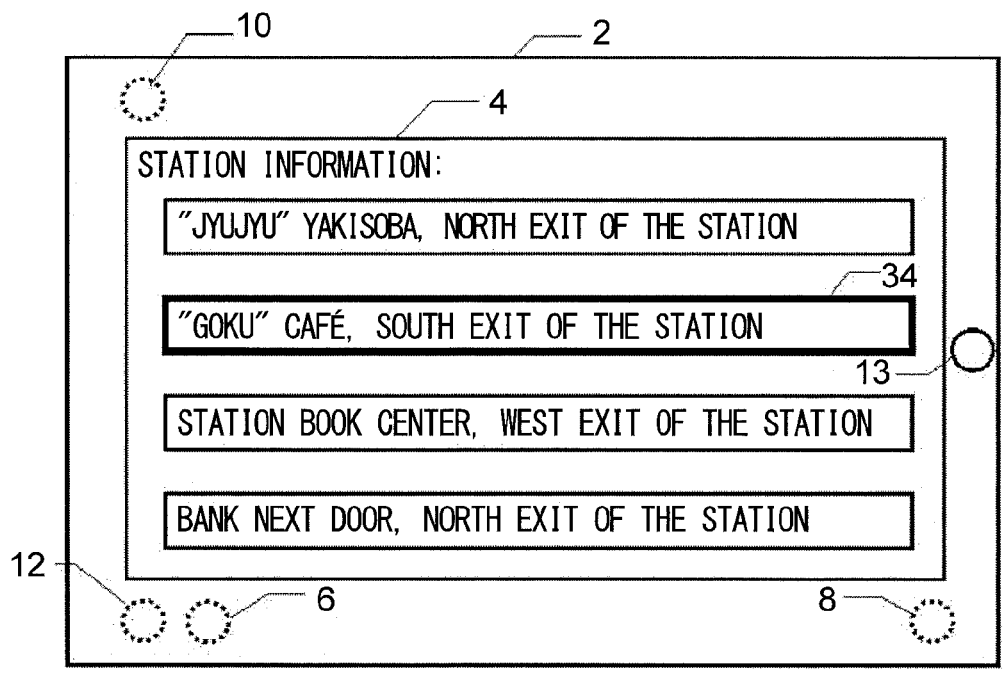
FIG. 5A illustrates a top view and FIG. 5B illustrates a back view.

The cellular telephone 2 can be operated not only when held vertically, as in FIGS. 1 to 4, but also when held horizontally. The change from being held vertically to being held horizontally is detected by the acceleration sensor, and the operations and display are switched. FIG. 5A is a top external view of the cellular telephone 2 illustrating the screen in the state of such a horizontal holding operation. Like constituent elements from FIG. 1 are given like reference numerals, and a description thereof has been omitted. FIG. 5A depicts a case where a "STATION INFORMATION" menu list is being displayed, as an example of a horizontal holding display. In the case where the display becomes that of the "STATION INFORMATION," as in FIG. 5A, due to an operation procedure described later, the entirety of the display unit 4 is again assigned to displaying the menu list for "STATION INFORMATION," rather than being divided into the upper region and the lower region. The menu designation at such a time can also be inputted by the detection of tilt or vibration by the acceleration sensor and by the detection of a two-handed operation by the infrared-beam-emitting units 8, 10, 12 and the infrared-beam-receiving sensor 6. The selected menu is displayed with the thick-framed cursor 34, and when the cellular telephone 2 is tapped with the middle finger or the like from the rear side in the state where the thick-framed cursor 34 is over any one of the menus, the selection is confirmed and the screen displays more detailed information.

In a case where the thick-framed cursor 34 of a horizontally written menu, as in FIG. 5A, is sent in the vertical direction by the movement of a hand, the operation becomes a two-handed one such that, for example, the cellular telephone 2 is held in the left hand and the right hand is moved over the display unit 4 in the vertical direction. Thereby, the infrared-beam-emitting units 8, 10, 12 and the infrared-beam-receiving sensor 6 detect the movement of the right hand and cause the thick-framed cursor 34 to move. The display of a horizontally written menu is employed not only in a case of horizontal holding, as in FIG. 5A, but also in a case of vertical holding, as in the four-item menu display of "PHONEBOOK," "MENU," "E-MAIL," and "CAMERA" in the basic function selection unit 16 of FIG. 1. In the case of vertical holding as well, the entirety of the display unit 4 may also in some cases be devoted to the display of horizontally written menus, rather than only the lower region, as in FIG. 1. In such a case, for example, the cellular telephone 2 being held in the left hand, the right hand is moved over the display unit 4 in the vertical direction, whereby the infrared-beam-emitting units 8, 10, 12 and the infrared-beam-receiving sensor 6 detect this movement and cause the cursor to move up or down.

Herein, it should be noted that the vertical direction in the case of horizontal holding, as in FIG. 5A, is the linear direction in which the infrared-beam-emitting unit 10 and the infrared-light-emitting unit 12 are linked, whereas in the vertical direction in the case of vertical holding, as in FIG. 1, is the linear direction in which the infrared-beam-emitting unit 8 and the infrared-light-emitting unit 12 are linked. Accordingly, when the hand is moved in the same manner in the vertical direction, the infrared-beam-emitting units 8, 10, 12 will have different outputs between the case of vertical holding and the case of horizontal holding. In view whereof, the question of whether the holding is vertical or horizontal is identified by the gravitational acceleration detected by the acceleration sensor, and the determination criteria table for the outputs of the infrared-beam-emitting units 8, 10, 12 is switched between horizontally held usage and vertically held usage. The cursor can thereby be moved in the vertical direction by a movement of the hand in an integrated vertical direction, irrespective of whether the holding is horizontal or vertical.

Similarly, the thumbnail display of an image is employed not only in the case of vertical holding, as in FIG. 4, but also in the case of horizontal holding. Herein, as well, when the cursor is moved by a movement of the hand in the horizontal direction, and when the cursor is moved thereby in the vertical direction, the infrared-beam-emitting units 8, 10, 12 will have different outputs between the case of vertical holding and the case of horizontal holding. In view whereof, with regard to the detection of the movement of a hand in a case where the thick-framed cursor 32 is moved up-down or left-right, as in FIG. 4, the question of whether the holding is vertical or horizontal is identified by the acceleration sensor, and the determination criteria table for the outputs of the infrared-beam-emitting units 8, 10, 12 is switched between horizontally held usage and vertically held usage. The cursor can thereby be moved in the up-down or horizontal direction by a movement of the hand in an integrated up-down or horizontal direction, irrespective of whether the holding is horizontal or vertical.

In the state in FIG. 4 where the enlarged image is displayed on the upper region 14, the acceleration sensor detects when the cellular telephone 2 is held horizontally, and a horizontal enlarged image can be displayed in the whole of the horizontal display unit 4, as in FIG. 5A. In so doing, even in the state where an image has been enlarged during the horizontally held state, the page can be turned one image at a time by a movement of the hand in the horizontal direction, and the image zoom operation can be performed by a movement of the hand in the vertical direction. Herein, as well, the infrared-beam-emitting units 8, 10, 12 will have different outputs from a movement of the hand in the horizontal direction and the vertical direction between the case of vertical holding and the case of horizontal holding. Accordingly, in the operations to zoom or turn the page by a horizontal or vertical movement of the hand as well, the question of whether the holding is vertical or horizontal is identified by the acceleration sensor, and the determination criteria table for the outputs of the infrared-beam-emitting units 8, 10, 12 is switched between horizontally held usage and vertically held usage. The operations to zoom or turn the page can thereby be performed by a movement of the hand in an integrated vertical or horizontal direction, irrespective of whether the holding is horizontal or vertical.

Figure 5B:
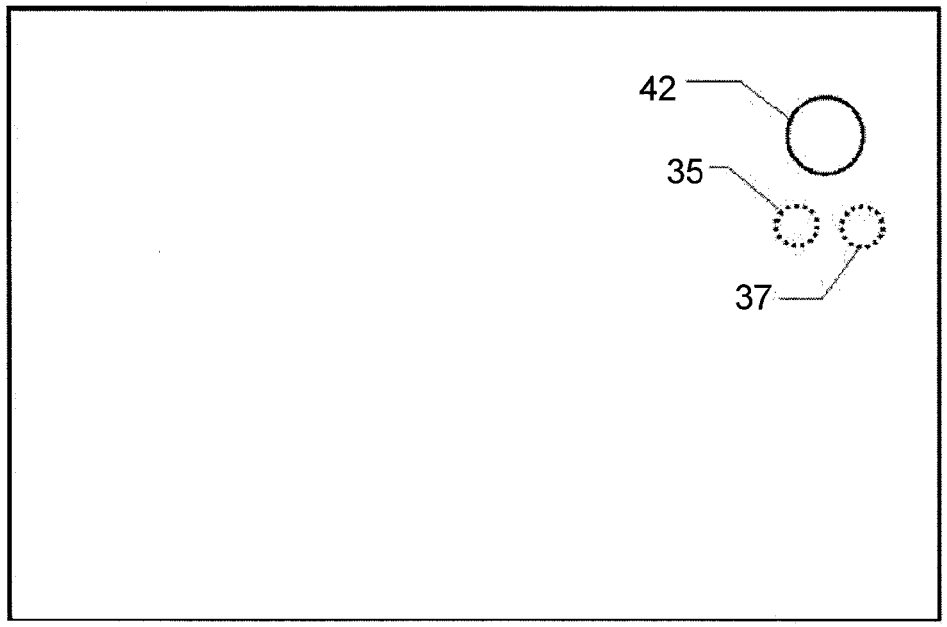

FIG. 5B is an external view of the back surface of the cellular telephone 2, depicted in the horizontally held state in a manner similar with respect to FIG. 5A, but is depicted in order to describe the features relating to the configuration of the back surface, rather than to describe the items pertaining in particular to the horizontally held state. In FIG. 5B, a back surface camera 42 is provided to the back surface of the cellular telephone 2 such that an image can be captured even while viewing an image displayed on the display unit 4. The back surface of the cellular telephone 2 is further provided with a back surface infrared-light-emitting unit 35 and, in proximity thereto, a back surface infrared-beam-receiving sensor 37. The back surface infrared-light-emitting unit 35 and the back surface infrared-beam-receiving sensor 37 are covered with an infrared-transmissive cover, similarly with respect to the back surface infrared-light-receiving sensor 6 and the infrared-light-emitting units 8, 10, 12 of the upper surface, and are therefore not visible from the outside in terms of design. The back surface infrared-beam-receiving sensor 37 is configured so as to be able to identify a state where the cellular telephone 2 is placed in close contact with a desk or the like, the back surface facing back, and a state where the cellular telephone 2 is held in the hand, by detecting the state of reflection of the infrared beam from the back surface infrared-light-emitting unit 35. Depending on the shape of the back surface of the cellular telephone 2, the back surface camera 42 is made to additionally function as the back surface infrared-beam-receiving sensor 37, the detection capability of the aforesaid configuration being thereby increased. When the back surface camera 42 is made to function as the infrared-light-receiving sensor 37, the configuration can also be such that a dedicated back surface infrared-beam-receiving sensor 37 is omitted.

Herein, a description of the power management of the cellular telephone 2 shall now be described. Most of the time, the cellular telephone 2 is in a so-called "standby" state, in which the display is turned off and the power consumption of the internal configuration is kept to a minimum. Then, in a case where the display of the cellular telephone 2 is turned on and the functions are started up, the back surface or a side surface of the cellular telephone 2 is tapped with the middle finger or thumb. The acceleration sensor of the cellular telephone 2, detecting the vibration from this tap and thereby determining that a startup operation has occurred, turns on the display and starts up various functions. To that end, a weak electrical current is supplied to the acceleration sensor in the standby state, and the acceleration sensor is configured so as to always be able to detect a vibration for a startup operation in a low power consumption mode which is lower than normal operation. The case of such a configuration necessitates that the acceleration sensor be prevented from mistakenly recognizing a vibration other than a tap intended for a startup as being a startup operation; the combination of the back surface infrared-light-emitting unit 35 and the back surface infrared-beam-receiving sensor 37 in FIG. 5B serves as means for preventing such a mistaken startup.

Specifically, in the standby state, the infrared-light-emitting unit 35 intermittently emits weak infrared light, and the back surface infrared-beam-receiving sensor 37 is put in a state so as to be able to detect the reflection of the infrared light. Accordingly, in a case where the cellular telephone 2 is placed on a desk or the like, the back surface facing back, the reflected light will increase depending on the proximity to the desk surface, and the reflected light will reach a maximum and stabilize due to close contact with the desk surface. To make this possible, the infrared-light-emitting unit 35 and the back surface infrared-beam-receiving sensor 37 are arranged so as to be in close proximity to each other, and are arranged at positions depressed slightly from the surface of the back surface of the cellular telephone 2 so as to prevent the infrared-light-emitting unit 35 and the back surface infrared-beam-receiving sensor 37 from being blocked by the desk surface, even though the actual back surface of the cellular telephone 2 is in close contact with the desk or other surface. In so doing, the specific pattern of changes in reflected light in the case where the cellular telephone 2 is placed on a desk surface are detected by the infrared-beam-receiving sensor 37; from the point in time where the pattern change in reflected light is detected up until the point in time when an attenuation in reflected light is detected when the cellular telephone 2 is subsequently lifted, a startup is prohibited even when the acceleration sensor detects a vibration. It is thereby possible to prevent a mistaken startup in cases such as where someone bumps up against the desk where the cellular telephone 2 has been placed or where the cellular telephone 2 has been placed on a vehicle seat, which constantly has vibrations. Furthermore, the combination of the infrared-beam-emitting unit 12 and the infrared-beam-receiving sensor 6, which are in close proximity to each other, can also be endowed with a similar mistaken startup prohibition function, whereby support can also be provided for a case where the cellular telephone 2 is placed on a desk or chair in a state where the upper surface is lying face down. Also, in so doing, the upper surface side and the back surface side can be provided with similar mistaken startup prohibition means, thereby allowing for the prevention of a mistaken startup due to the vibration of the body when the cellular telephone 2 is put into a pocket.

In other possible configurations, the momentary impact when the cellular telephone 2 is placed on a desk or the like may be detected by the acceleration sensor, and the fact that the cellular telephone 2 has been placed on a desk or the like may be detected by the combination of the pattern of the increase in reflected light between close proximity to and close contact with the desk surface and the detection, by the acceleration sensor, of the impact at the time of close contact with the desk surface, whereby the startup prohibition is more reliably triggered. With respect to the release of the startup prohibition, the configuration may be such that the startup prohibition is released on the basis of the combination of the detection of an increase in reflected light when the cellular telephone 2 is lifted and the detection of acceleration upon the act of picking up and holding.

This combination is not limited to the combined use of the increased reflected light detection output and the detection output of the acceleration detection. For example, a combination is also possible where the configuration is such that after the startup prohibition is triggered, the functions of the back surface camera 42 and the back surface infrared-light-emitting unit 35 are halted and, at the stage where the acceleration sensor has detected acceleration, the functions of the back surface camera 42 and the back surface infrared-light-emitting unit 35 are started up. According to such a combination, the intensity of the reflected light when the back surface is in close contact is stored and, at the stage where acceleration has been detected, the detected intensity of the reflected light is compared against the stored intensity of reflected light, whereby it is possible to identify whether the detection of acceleration is due to the cellular telephone 2 being lifted or whether the back surface of the cellular telephone 2 remains in a state of being in close contact with the desk or the like. There is accordingly no longer any need to start up the functions of the back surface camera 42 and the back surface infrared-light-emitting unit 35 at all times, the effect being that power is saved.

Figure 6:
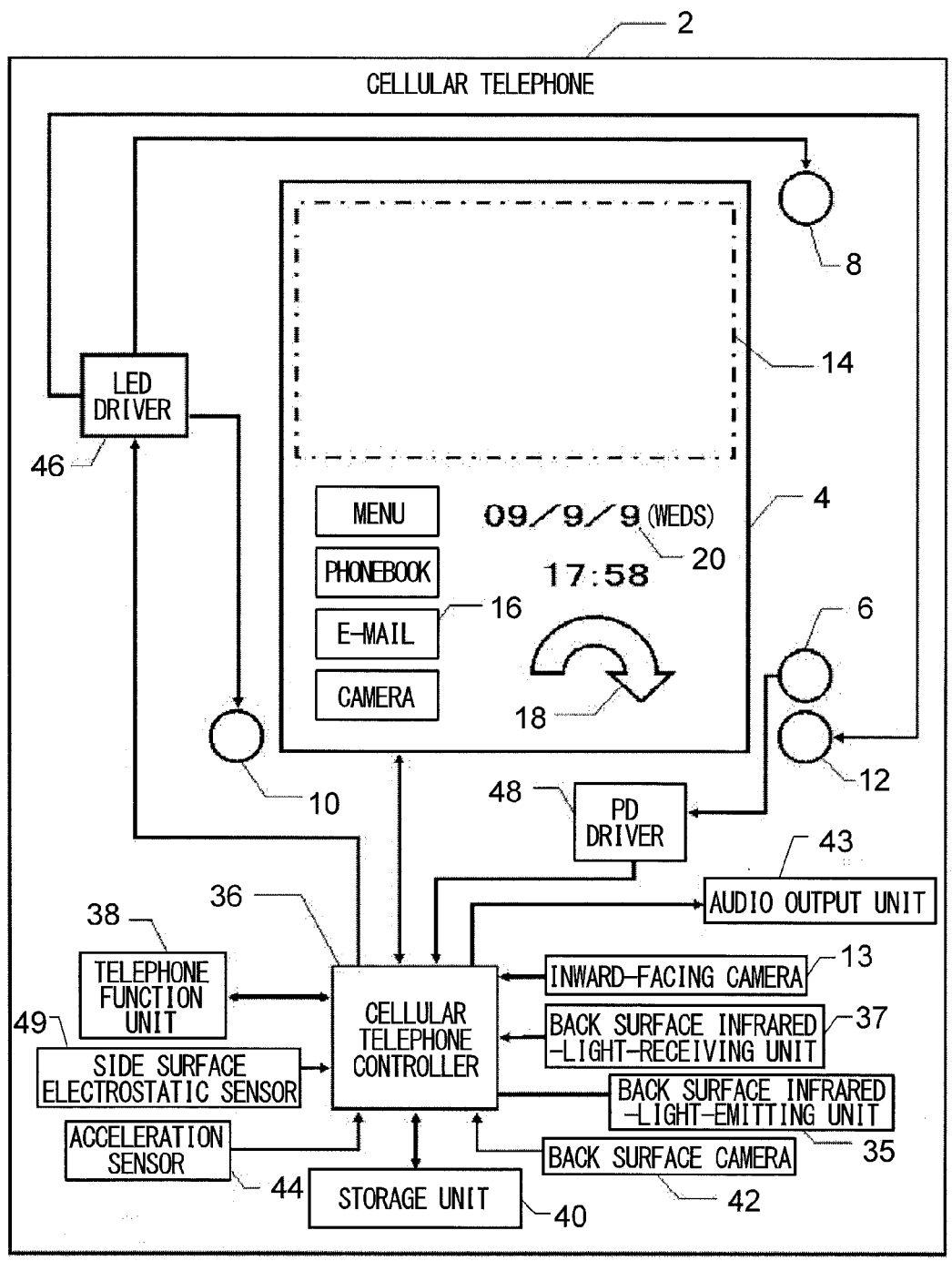
FIG. 6 is a block diagram of a cellular telephone in the aforesaid embodiment.

FIG. 6 is a block diagram of the cellular telephone 2 in the above embodiment of the mobile device of the present invention. Like constituent elements from FIG. 1 are given like reference numerals, and a description thereof has been omitted. A cellular telephone controller 36, which includes a microcomputer, is driven by a predetermined clock and controls the cellular telephone 2, and, in collaboration with a telephone function unit 38, executes typical cellular telephone functions. A storage unit 40 stores a computer program needed for the functions of the cellular telephone controller 36 and also stores needed data. A phonebook and other forms of text data as well as image data captured by the back surface camera 42 and other data are also stored. An acceleration sensor 44, as has already been described, detects the tilt, vibration, impact, and the like of the cellular telephone 2 as input information, and sends the detection information to the cellular telephone controller 36. An LED driver 46 controls the emitted light of the infrared-beam-emitting units 8, 10, 12, which comprise LEDs, by time division on the basis of an instruction from the cellular telephone controller 36. A photodiode driver 48 detects, and sends to the cellular telephone controller 36, the light-receiving conditions of the infrared-beam-receiving sensor 6, which comprises a photodiode, on the basis of an instruction from the cellular telephone controller 36. At such a time, the LED driver 46 and the PD driver 48 are coordinated in time division, it being therefore possible to identify whether the output of the infrared-beam-receiving sensor 6 is based on the emitted light of the infrared-beam-emitting unit 8, 10, or 12. The LED driver 46 can also cause the intensity of the emitted light of the infrared-beam-emitting units 8, 10, 12 to vary by PWM control or the like, and, as has already been described, can cause the intensity of the emitted light thereof to vary between the case where a movement of the left hand thumb is detected and the case where a movement of the right hand thumb is detected.

Further, a side surface electrostatic sensor 49 detects whether the cellular telephone 2 is being retained by the hand of an operator, the detection results being sent to the cellular telephone controller 36, thereby excluding the mistaken detection of an operation input by the acceleration sensor 44 or the infrared-beam-receiving sensor 6 at a time when no operation is intended. Specifically, unless it is detected that the cellular telephone 2 is being retained by the hand of the operator, a startup due to the acceleration sensor 44 is prohibited, whereby it becomes possible to prevent a mistaken startup from the standby state in a case where the cellular telephone 2 has been placed on a desk or on a vehicle seat. In so doing, the direct detection, by the side surface electrostatic sensor 49, of retention by the operator makes it possible to prevent a mistaken startup in a manner similar to the use of the combination of the back surface camera 42 and the back surface infrared-light-emitting unit 35.

An audio output unit 43 has a function for converting audio content data to a sound signal when music or another form of audio content stored in the storage unit 40 is to be played back, and also has a speaker for turning the same into a sound signal and an output terminal for outputting an audio signal to earphones or another exterior accessory. The acceleration sensor 44 doubles as an input unit for adjusting the volume of the audio signal from the audio output unit 43, and detects a tapped point on the cellular telephone 2 or a tap rhythm pattern to raise or lower the volume.

Figure 7A:
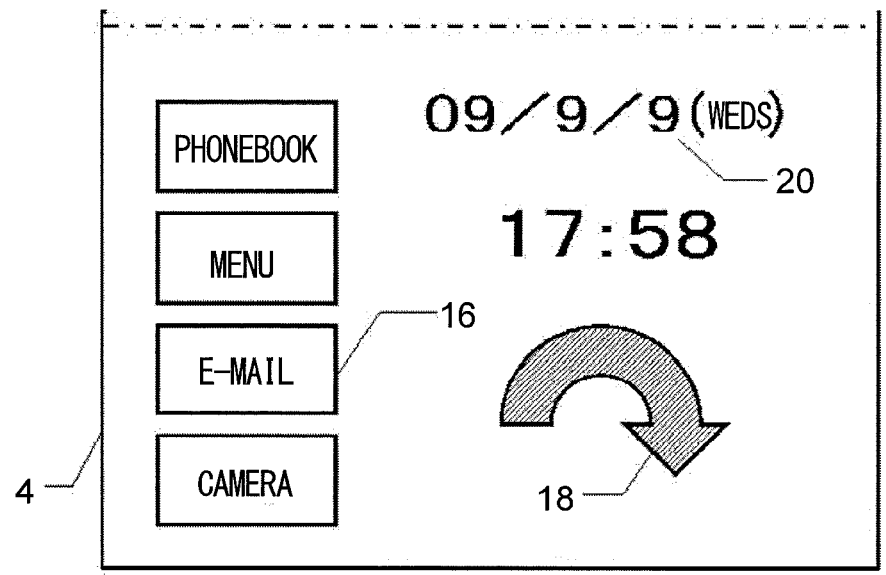
FIG. 7 is a view of a screen operation in the aforesaid embodiment, illustrating the state of an operation to "PROCEED" from FIG. 7A to FIG. 7B.
Figure 7B:
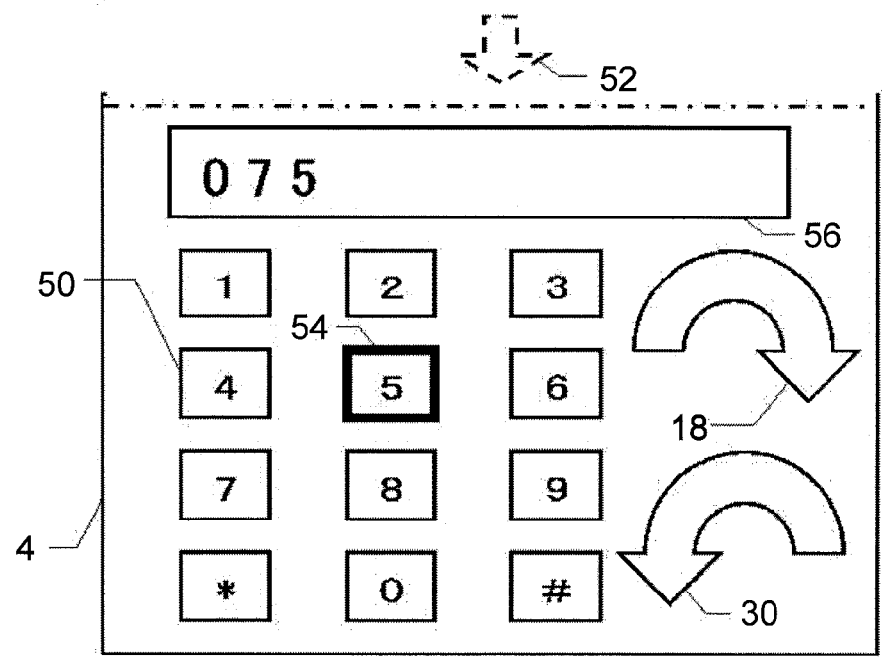

FIG. 7 is a view of an operation screen illustrating an operation in greater detail, and describes a case of single-handed operation as in FIGS. 1 to 3. Only the lower region of the display screen 4 is depicted, in order to provide a list of the changes to the screen due to the operation. Like constituent elements from FIG. 1 are given like reference numerals, and a description thereof has been omitted unless needed. FIG. 7A is a similar display screen to that of FIG. 1, being the initial screen of the state when the power to the cellular telephone 2 is switched on, as has been described with FIG. 1. Switching on the power to the cellular telephone 2 involves tapping the cellular telephone 2 a plurality of times from the back surface with the middle finger or the like in a predetermined rhythm. The predetermined rhythm is one means for preventing the power from being unintentionally switched on by an unintended vibration to the cellular telephone 2; a chosen rhythm that does not otherwise occur naturally can be pre-registered. The mistaken operation prevention function using this predetermined rhythm registration can also be used to prevent the mistaken startup of a case where the display is turned on and various functions are started up from the standby state when power to the cellular telephone 2 is switched on.

Also, in FIG. 7A, the "PROCEED" finger trajectory instruction mark 18 has been shaded in; this shows there to be a state where the finger is detected to have moved along the trajectory. Then, when this has been detected, the display is changed to a telephone mode illustrated in FIG. 7B, and a dialing number board 50 and the like are displayed. The dashed arrow 52 indicates the direction in which the display changes from FIG. 7A to FIG. 7B in this manner. A dialed number can be inputted by the detection of tilt or vibration by the acceleration sensor 44 and by the detection of a thumb operation by the infrared-beam-emitting units 8, 10, 12 and the infrared-beam-receiving sensor 6. A thick-framed cursor 54 is displayed on a selected number, and whenever the cellular telephone 2 is tapped from the rear side with the middle finger or the like in the state where the thick-framed cursor 54 is over any number, the number is confirmed and inputted into a number display window 56. When the input of a dialed number is finished and a finger is moved along the "PROCEED" finger trajectory instruction mark 18 in the state in FIG. 7B, an outgoing call is made to the dial destination. When there is an incoming call from outside in the standby state of FIG. 7A, reception is started when a finger is moved along the "PROCEED" finger trajectory instruction mark 18, a transition then being made to the state in FIG. 7B.

Figure 8A:
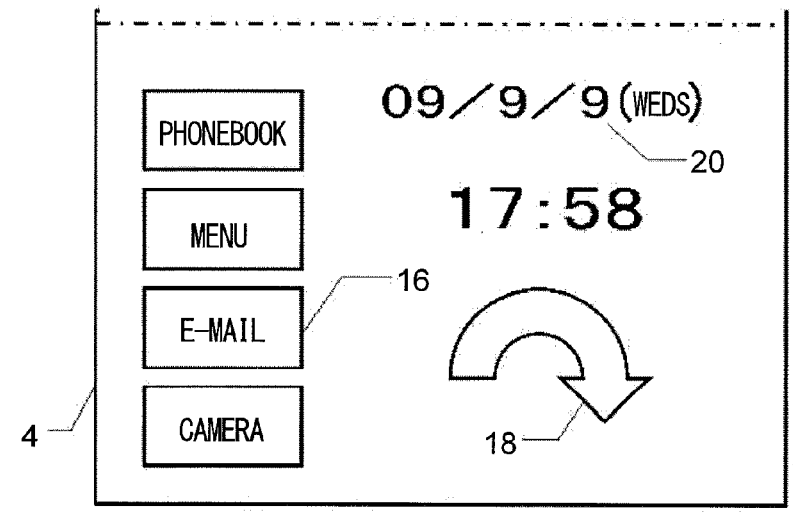
FIG. 8 is a view of an operation screen similar to FIG. 7, illustrating the state of an operation "GO BACK" from FIG. 8B to FIG. 8A.
Figure 8B:
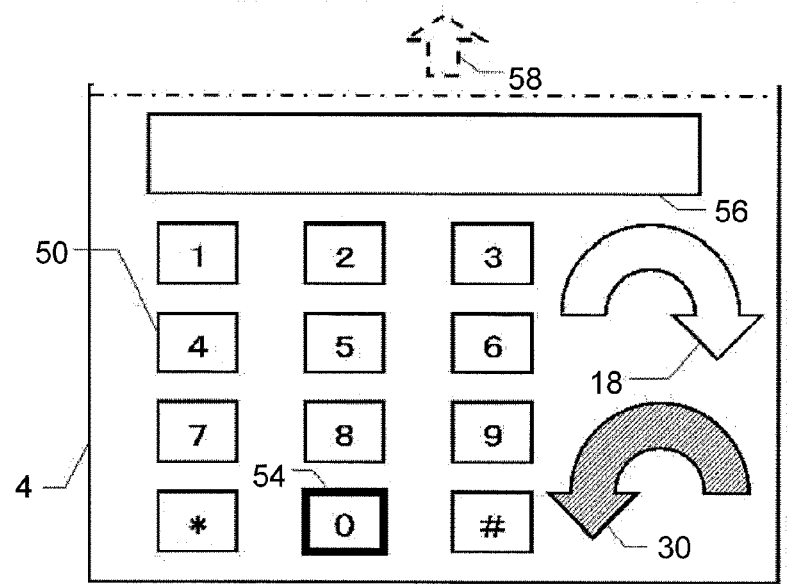

FIG. 8 is a similar drawing to that of FIG. 7, but FIG. 8B illustrates that the state is such that a counterclockwise movement of a finger along the trajectory, as shaded in for the "GO BACK" finger trajectory instruction mark 30, has been detected. Then, when this detection occurs, in a case where numbers have been inputted to the number display window 56, firstly the numbers are deleted one by one each time a movement of a finger along the "GO BACK" finger trajectory instruction mark 30 is detected. It thereby becomes possible to correct a mistaken input. In a state where a number has not been inputted into the number display window 56, the display returns to the initial screen of FIG. 8A, as illustrated by the dashed arrow 58, when the movement of a finger along the "GO BACK" finger trajectory instruction mark 30 is detected. In a telephone conversation state, communication is blocked when the movement of a finger along the "GO BACK" finger trajectory instruction mark 30 is detected from the screen of FIG. 8B.

In the display state of FIGS. 7A and 8A, the only movement of a finger that will receive a response is a movement on the "PROCEED" finger trajectory instruction mark 18. In other words, although a finger may be moved over the display of the basic function selection unit 16, the cellular telephone 2 will not respond. Also, in FIGS. 7B and 8B, the display of the basic function selection unit 16 has disappeared. Accordingly, in both cases of FIG. 7 or 8, there will be no mistaken operation of the basic function selection unit 16, and only the telephone function is possible. The present invention thus prevents mistaken input by coordinating the display state of the display unit 4 with the detection of the movement of a hand by the infrared-beam-emitting units 8, 10, 12 and the infrared-beam-receiving sensor 6.

The input detection from the previously described combination of the infrared-beam-emitting units 8, 10, 12 and the infrared-beam-receiving sensor 6 is based on the detection of the movement of a hand or finger relative to the cellular telephone 2. Accordingly, when the hand-held cellular telephone 2 experiences unintended shaking, even though a finger or hand may have been moved as intended, the relative movement will be a synthesis of the shaking of the cellular telephone 2 with the movement of the finger or hand, and the output of the infrared-beam-emitting units 8, 10, 12 will not in all cases accurately reflect the intention of the finger or hand movement. To address this, the acceleration sensor 44 detects shaking of the cellular telephone 2, and the output of the infrared-beam-emitting units 8, 10, 12 is corrected to be information to the extent that the cellular telephone 2 had not experienced shaking. For this correction, the unique, individually different shaking of the cellular telephone 2 specific to a single-handed operation and a two-handed operation when the finger or hand is moved is studied, and such studied information is also taken into consideration, instead of merely the information on the shaking detected at the relevant time.

Figure 9A:
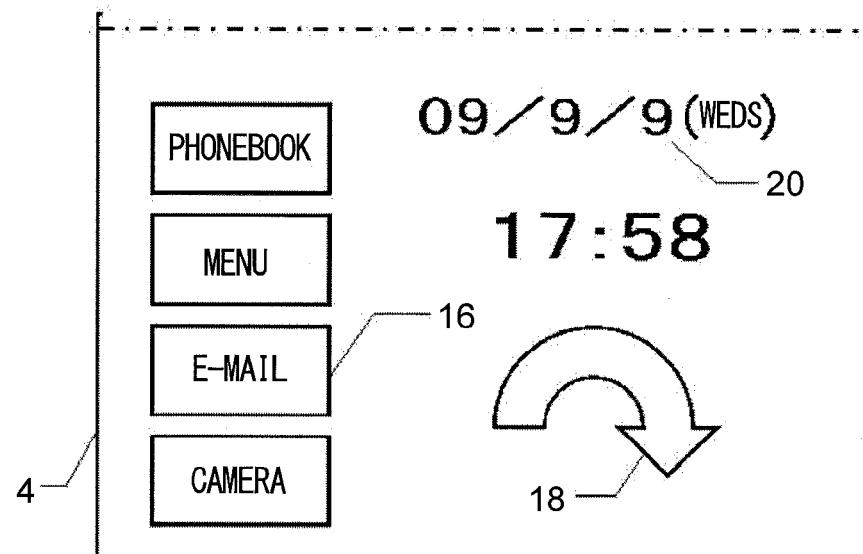
FIG. 9 is a view of an operation screen in the aforesaid embodiment, illustrating the change in display and operation in a case where a function mode other than that of a telephone function is selected from an initial screen.
Figure 9B:
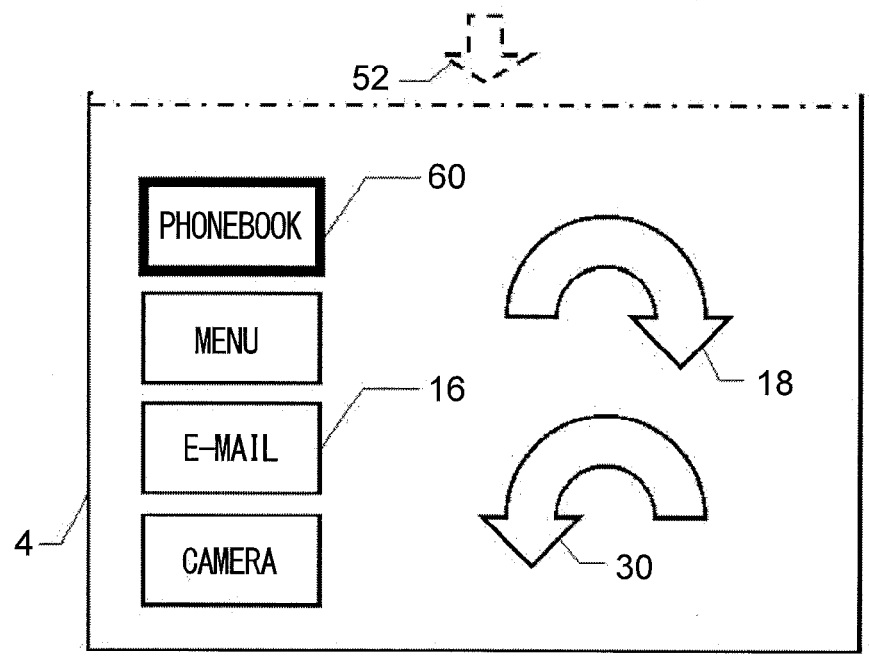

FIG. 9 illustrates the operation and change in display in the case where a function mode other than the telephone function is selected from the initial screen. Activating the basic function selection unit 16, similarly with respect to turning on the power, involves tapping the cellular telephone 2 a plurality of times from the back surface with the middle finger or the like in a predetermined rhythm. The predetermined rhythm serves to prevent the power from being unintentionally switched on by an unintended vibration to the cellular telephone 2; a chosen rhythm that does not otherwise occur naturally can be pre-registered. This rhythm may be identical to when the power is turned on, or a different one may also be registered. When the acceleration sensor 44 detects such tapping, the state changes from that of FIG. 9A to that of FIG. 9B, as illustrated by the dashed arrow 52, indicating that the basic function selection unit 16 has been activated; a thick-framed cursor 60 is therefore displayed on any one of the four menu lists "PHONEBOOK," "MENU," "E-MAIL," or "CAMERA."

Figure 10A:
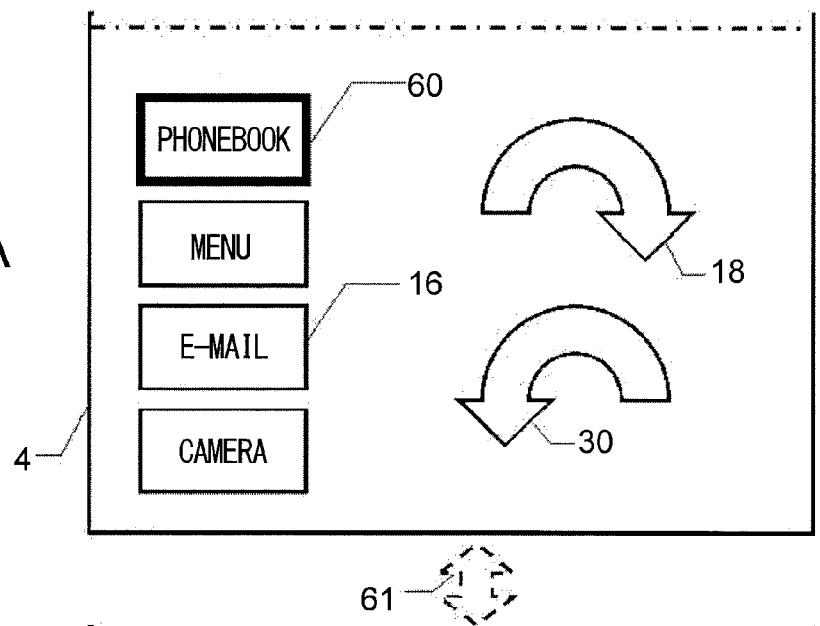
FIG. 10 is a view of a screen operation after the changes in the state shown in FIG. 9 have occurred, illustrating the operation to move a cursor between FIGS. 10A and 10B.
Figure 10B:
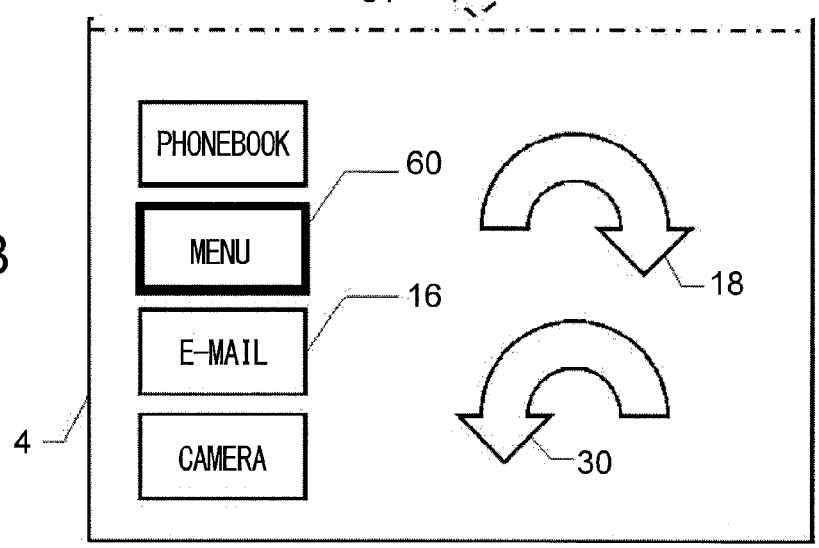

FIG. 10 illustrates the cursor moving operation in the state where the basic function selection unit 16 has been activated through the progression from FIG. 9A to FIG. 9B. The thick-framed cursor 60 in this state is moved through the detection, by the acceleration sensor 44, of the tilt of the cellular telephone 2. Specifically, when, in the case where the upper surface of the cellular telephone 2 is facing up, the upper side of the cellular telephone 2 is lifted relatively higher, the thick-framed cursor 60 is moved from up to down, as from FIG. 10A to FIG. 10B. Conversely, when, in the case where the upper surface of the cellular telephone 2 is facing up, the lower side of the cellular telephone 2 is lifted relatively higher, the thick-framed cursor 60 is moved from down to up, as from FIG. 10B to FIG. 10A. This is an imitation of movement in accordance with gravitational pull. However, in the case where the upper surface of the cellular telephone 2 is facing down, such as in the case where one is lying down and looks up to view the cellular telephone 2, when the lower side of the cellular telephone 2 is lifted relatively higher, the thick-framed cursor 60 is moved from up to down, as from FIG. 10A to FIG. 10B. Further, when, in the case where the upper surface of the cellular telephone 2 is facing down, the upper side of the cellular telephone 2 is lifted relatively higher, the thick-framed cursor 60 is moved from down to up, as from FIG. 10B to FIG. 10A. This movement, too, imitates movement in accordance with gravitational pull. In this manner, in the state of FIG. 10, the thick-framed cursor 60 moves up and down between FIGS. 10A and 10B in accordance with the direction of tilt of the cellular telephone 2, as illustrated by the bidirectional arrow 61.

The detection of tilt of the cellular telephone 2 in the aforesaid movements is strictly relative, and is no way based on the absolute posture of the cellular telephone 2. Next, the manner in which tilt is referenced for the detection of relative movement shall now be described. In the state where, as in FIG. 10, the basic function selection unit 16 has been activated, when the thumb is shaken so as to traverse the lower region of the display unit 4 in any desired direction, this movement is detected by the infrared-beam-emitting units 8, 10, 12 and the infrared-beam-receiving sensor 6; the reference position is reset and, in this state, the movement of the thick-framed cursor 60 is halted, irrespective of the state of tilt of the cellular telephone 2. This operation to reset the reference position may be performed not only by a movement of the thumb in a single-handed operation, but also by a movement such that the hand that is free in a two-handed operation traverses the entirety of the display unit 4. Then, the gravitational acceleration detected by the acceleration sensor 44 at the tilt of the cellular telephone 2 where the reference position is reset is stored in the storage unit 40. This stored value is referenced to compare later detection output of the acceleration sensor 44 against this acceleration in the cellular telephone controller 36 and determine whether the upper side or lower side of the cellular telephone 24 is thereafter lifted relatively higher. In this manner, because the reference position is reset each time the finger or hand is shaken on the display unit 4, the thick-framed cursor 60 can be prevented from moving contrary to intention even when posture is changed while the cellular telephone 2 is being held.

Figure 11A:
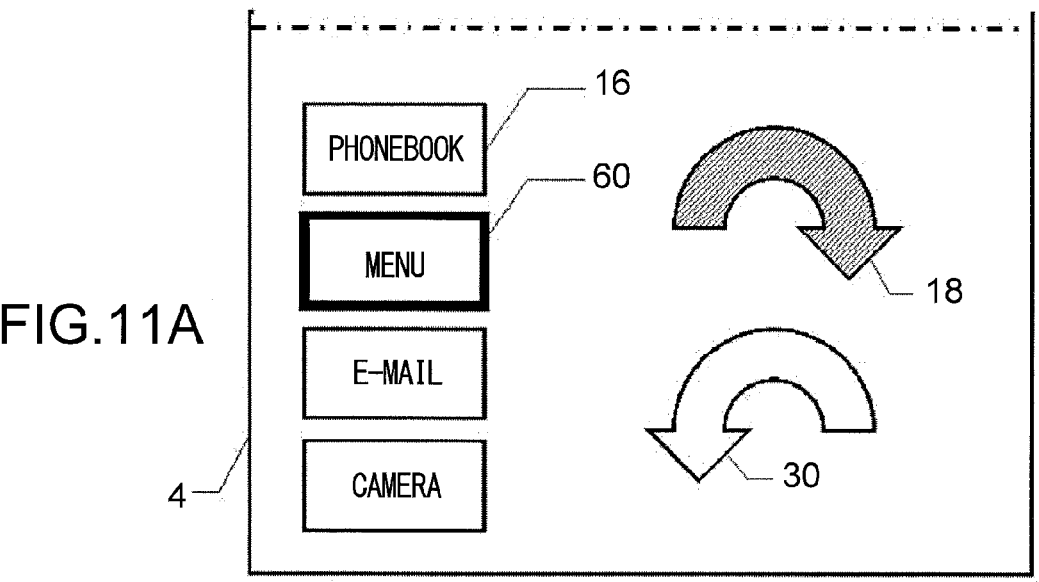
FIG. 11 is a view of an operation screen in the aforesaid embodiment, illustrating the state of an operation to "PROCEED" from FIG. 11A to a "MENU" screen of FIG. 11B.
Figure 11B:
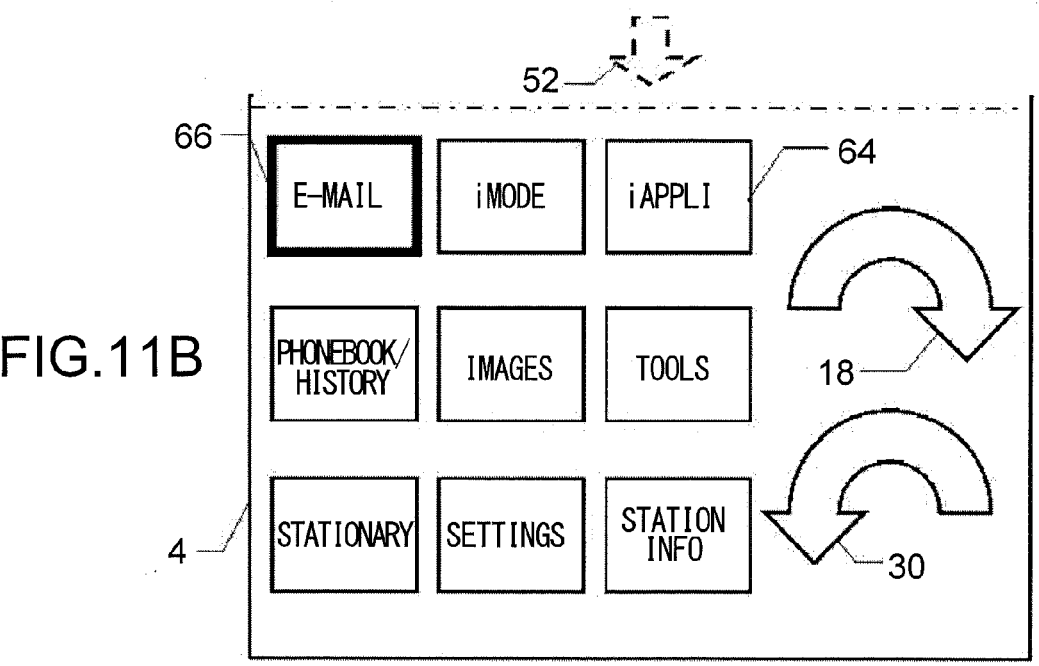

FIG. 11A illustrates the state where the infrared-beam-emitting units 8, 10, 12 and the infrared-beam-receiving sensor 6 detect that a finger has been moved along the trajectory of the "PROCEED" finger trajectory instruction mark 18 in the state where the thick-framed cursor 60 is on "MENU" in the menu list of the basic function selection unit 16, thus confirming the selection of "MENU" in the menu list. To provide an illustration thereof, the "PROCEED" finger trajectory instruction mark 18 has been shaded in FIG. 11A. When the selection "MENU" is detected and confirmed in this manner, the display changes, as illustrated by the arrow 52, to the detailed menu selection mode of FIG. 11B, and a plurality of detailed menu icons 64 are displayed. The detailed menu icons 64 can be selected through either the detection of tilt or vibration by the acceleration sensor 44 or through the detection of a thumb operation by the infrared-beam-emitting units 8, 10, 12 and infrared-beam-receiving sensor 6; a thick-framed cursor 66 is displayed on the selected detailed menu icon.

Then, the infrared-beam-emitting units 8, 10, 12 and the infrared-beam-receiving sensor 6 detect when a finger is moved along the trajectory of the "PROCEED" finger trajectory instruction mark 18 in the state where the thick-framed cursor 66 is one of the detailed menu icons, thus confirming the selection of the detailed menu icon, and there is a transition to the next screen. By contrast, the infrared-beam-emitting units 8, 10, 12 and the infrared-beam-receiving sensor 6 also detect when the finger is moved along the trajectory of the "GO BACK" finger trajectory instruction mark 30, and though the thick-framed cursor 66 may be on one of the detailed menu icons, there is a return from FIG. 11B to the screen of FIG. 11A.

Figure 12A:
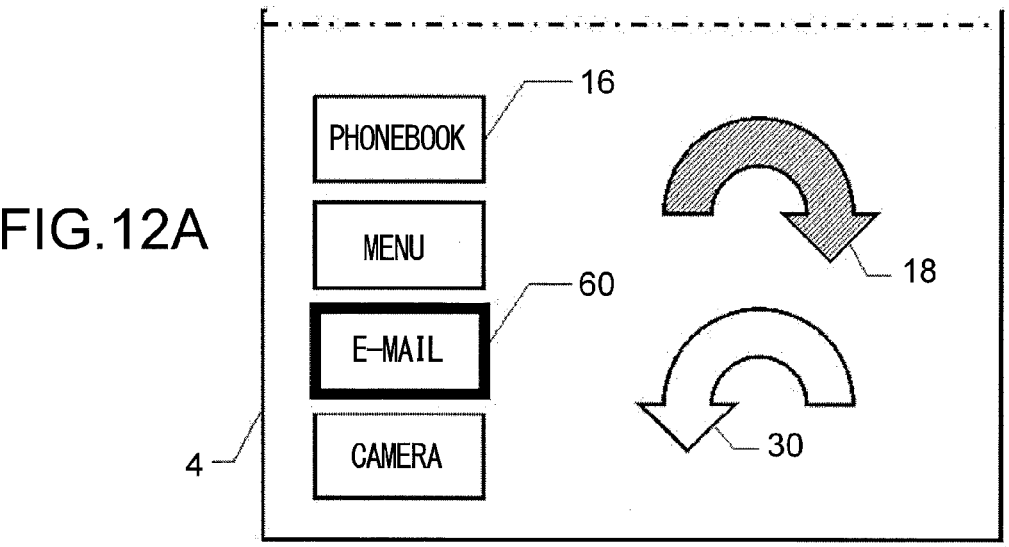
FIG. 12 is a view of an operation screen in the aforesaid embodiment, illustrating the state of an operation to "PROCEED" from FIG. 12A to an "E-MAIL" screen of FIG. 12B.

FIG. 12A illustrates the state where the infrared-beam-emitting units 8, 10, 12 and the infrared-beam-receiving sensor 6 detect that a finger has been moved along the trajectory of the "PROCEED" finger trajectory instruction mark 18 in the state where the thick-framed cursor 60 is on "E-MAIL" in the menu list of the basic function selection unit 16, thus confirming the selection of "E-MAIL" in the menu list. Then, similarly with respect to FIG. 11, when the selection "E-MAIL" is detected and confirmed, the display changes, as illustrated by the arrow 52, from FIG. 12A to FIG. 12B, and an e-mail input screen is displayed. This being identical to FIG. 3, a detailed description of the operation thereof has been described by FIG. 3 and is therefore omitted.

Figure 12B:
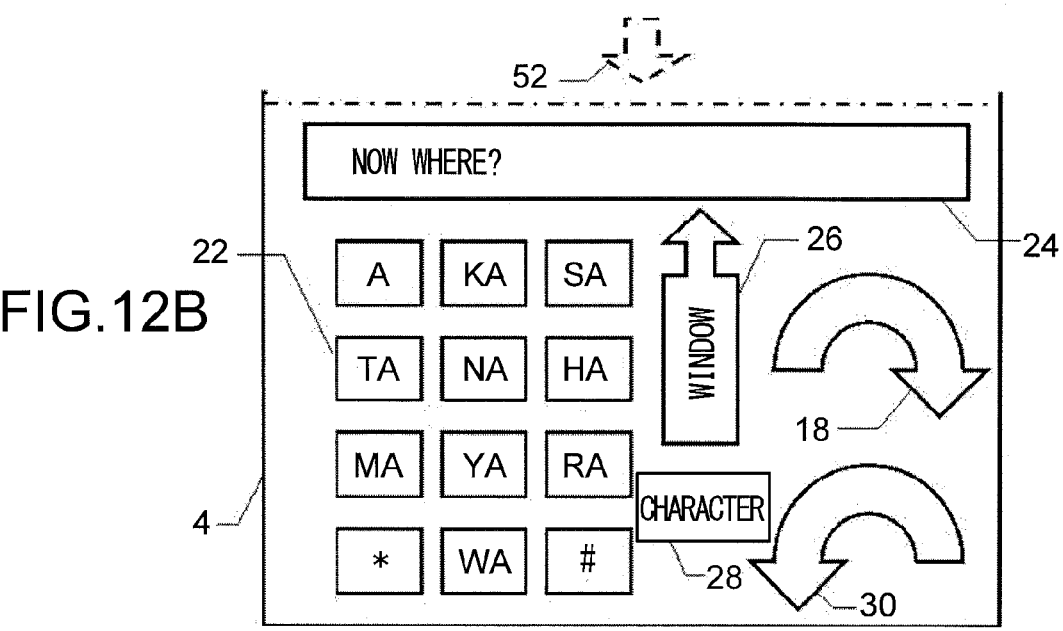

In FIG. 12B, the infrared-beam-emitting units 8, 10, 12 and the infrared-beam-receiving sensor 6 detect when a finger is moved along the trajectory of the "GO BACK" finger trajectory instruction mark 30, and, in a case where characters have been inputted into the input window 24, the characters are deleted one by one each time a movement of a finger along the "GO BACK" finger trajectory instruction mark 30 is detected. In the state where no characters have been inputted into the input window 24, the infrared-beam-emitting units 8, 10, 12 and the infrared-beam-receiving sensor 6 detect when a finger is moved along the "GO BACK" finger trajectory instruction mark 30, and there is a return from FIG. 12B to the screen of FIG. 12A.

Figure 13:
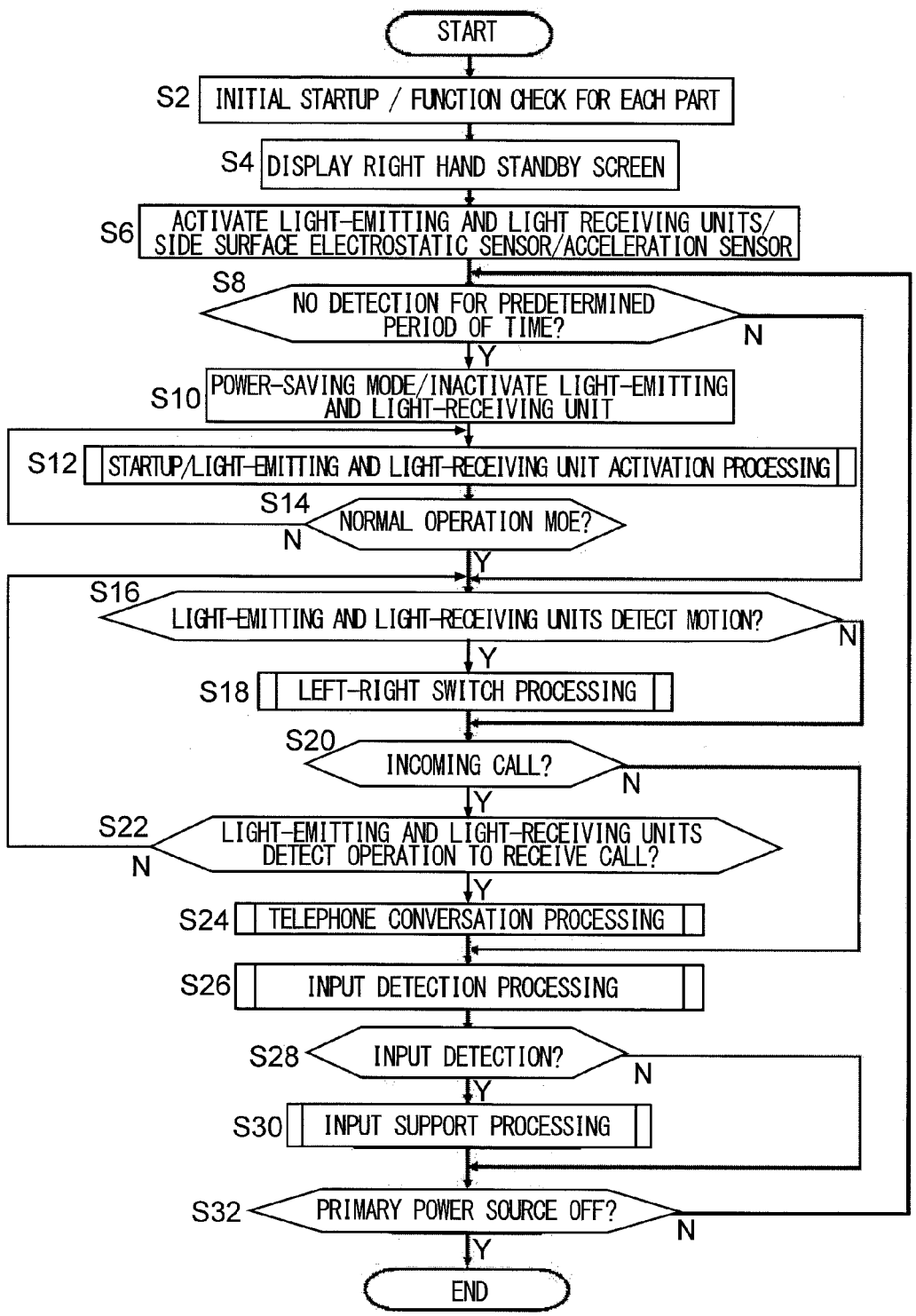
FIG. 13 is a basic flow chart illustrating the functions of a controller of the cellular telephone of FIG. 6 in the aforesaid embodiment.

FIG. 13 is a basic flow chart illustrating the functions of the cellular telephone controller 36 in FIG. 6 in the embodiment of the present invention. The flow is triggered when the primary power source of the cellular telephone 2 is turned on; in step S2, the cellular telephone 2 is initially booted up and the functions of each of the parts are checked. Then, in step S4, a standby screen for a right hand operation, as in FIG. 1, is displayed on the display unit 4. In step S6, the infrared-beam-emitting units 8, 10, 12 and the infrared-light-receiving sensor 6 on the front surface; the infrared-beam-emitting unit 35 and the infrared-beam-receiving sensor 37 of the back surface; the side surface electrostatic sensor 49; and the acceleration sensor 44 are all activated.

Next, in step S8, during a predetermined period of time, there is a check as to whether a state free of detections by these sensors persists. Then, when the state free of detections persists, the flow proceeds to step S10, entering a power-saving mode in which the back light of the display unit 4 is deactivated, the clock period of the cellular telephone controller 36 is lowered, and the like. In Step S10, the infrared-beam-emitting units 8, 10, 12, 35 and the infrared-beam-receiving sensors 6, 37 are also inactivated. These light-emitting and light-receiving units repeatedly emit and receive light in a predetermined period and detect the movement of a hand or finger in an activated state, but in the inactivated state, at least the emission of light by the infrared-light-emitting units 8, 10, 12, 35 is halted.

Next, in step S12, a startup is performed to return to the normal operating mode from such a power-saving mode, and a process for activating the light-emitting and light-receiving units is switched on. This process, a detailed description of which will be provided below, is a process for detecting that the cellular telephone 2 has been lifted or the like and causing an automatic startup. The results of this process are checked in step S14 to confirm whether or not there has been a startup to the normal mode. When a startup to normal operation cannot be confirmed, the flow returns to step S12, following which steps S12 and S14 are repeated in anticipation of a startup. On the other hand, when a startup to normal operation is confirmed in step S14, the flow transitions to step S16. When it is confirmed that the state free of detection is not detected for the predetermined period of time in step S8, the flow transitions directly to step S16. In such a case, the normal operating mode continues without the power-saving mode being turned on.

In step S16, there is a check as to whether a movement of a hand or finger has been detected by the light-emitting and light-receiving units. Whenever there is any kind of detection, the flow proceeds to step S18, which involves processing for switching the screen of the display unit 4 to the screens for right handed operation, as in FIG. 1, or for left-handed operation, as in FIG. 2, on the basis of the detected movement. This processing, as has already been described, identifies the pattern of the initial movement of the finger over the display unit 4 and determines whether the movement is specific to the thumb of the right hand or to the thumb of the left hand. Upon the execution of a left-right switch in accordance with need, the flow transitions to step S20. When no movement of a hand of finger is detected by the light-emitting and light-receiving units at the stage of step S16, the flow transitions directly to step S20.

In step S20, there is a check as to whether there has been an incoming telephone call to the cellular telephone 2. When there is an incoming call, the flow proceeds to step S22, in which there is a check as to whether the light-emitting and light-receiving units have detected a movement of a finger tracing the "PROCEED" finger trajectory instruction mark 18 in FIG. 1 or FIG. 2. When this movement occurs during an incoming call, the significance is that an operation to receive the call has been performed. When this movement is detected, the flow proceeds to the telephone conversation process in step S24. The telephone conversation process is the process occurring during a typical telephone call. On the other hand, in the case where the aforesaid operation to receive the call is not detected in step S22, the flow returns to step S16, following which steps S16 to S22 are repeated in anticipation of an operation to receive the call so long as the incoming call state persists.

When the telephone conversation is finished and the telephone call is interrupted, the conversation processing telephone call of step S24 is completed, and the flow transitions to step S26. However, when the telephone call is interrupted with no processing to receive the call having been performed, it having not been possible to detect an incoming call state in step S20, the flow proceeds directly to step S26. Step S26 involves processing for detecting various forms of input to the cellular telephone 2 by the light-emitting and light-receiving units or the acceleration sensor 44, as described in FIGS. 1 to 12. Step 26 also includes left-right switching processing similar with respect to step S18. A more detailed description of the input detection processing of step S26 shall be provided below. When the input detection processing is finished, the flow proceeds to step S28, in which there is a check for whether any kind of input has been detected. Then, in the case where input is detected in step S28, the variety of input-support processes, as described using FIGS. 1 to 12, are executed in step S30 in accordance with the detected input. A more detailed description of the input-support process of step S30 shall be provided below. When the input-support process is finished, the flow transitions to step S32. On the other hand, in the case where it is confirmed in step S28 that no input was detected, the flow transitions directly to step S32.

Step S32 involves a check as to whether the primary power source has been turned off; in the case where the primary power source is not detected as being off, the flow returns to step S8. Thereafter, step S8 to S32 are repeated until the primary power source is off; support for the various forms of input, the transition to the power-saving mode, and the return to the normal operating mode are all executed. The flow is terminated when the primary power source is detected as being off in step S32.

Figure 14:
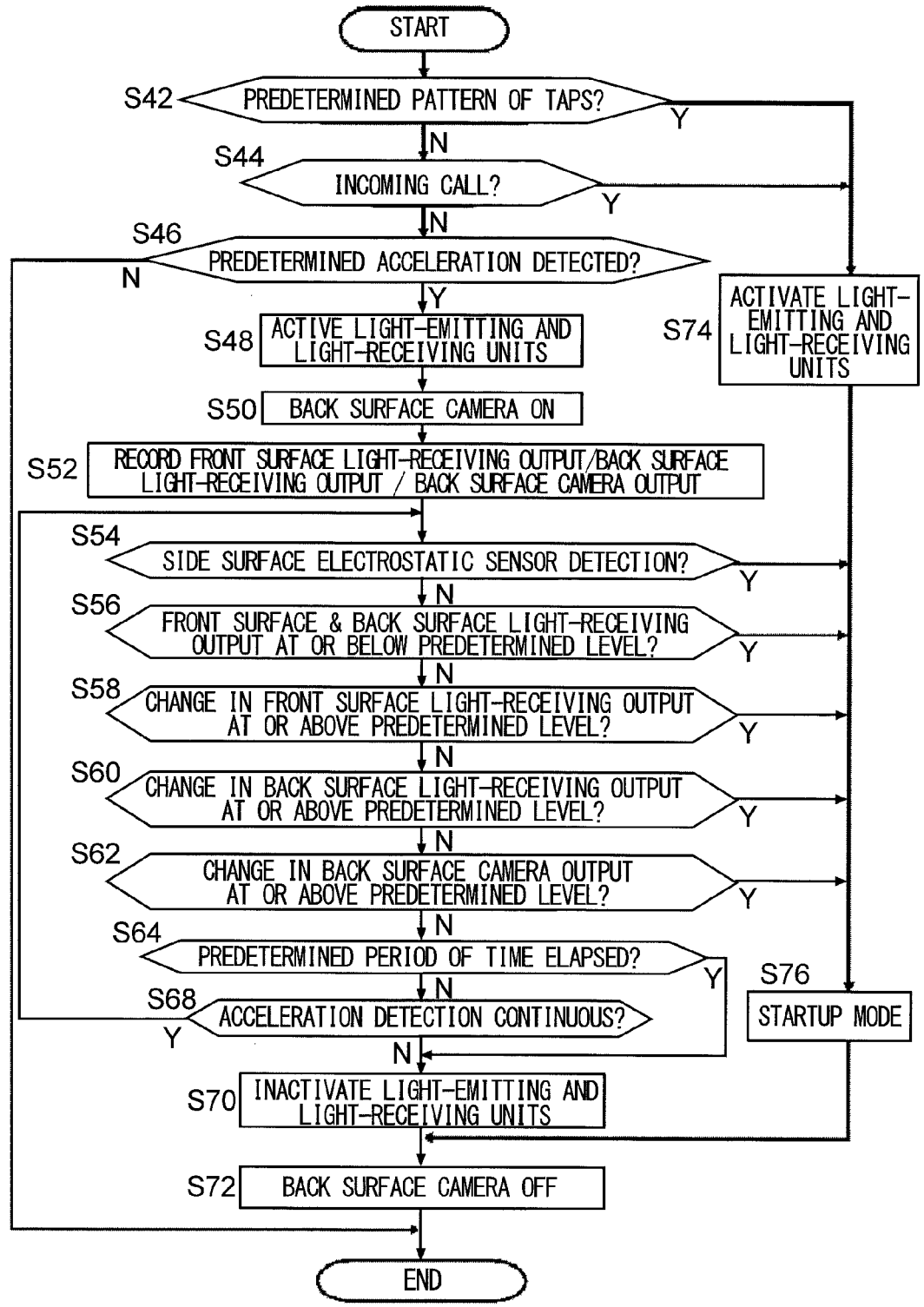
FIG. 14 is a flow chart providing a detailed illustration of step S12 in FIG. 13.

FIG. 14 is a flow chart providing a detailed illustration of the startup/light-emitting and light-receiving activation processing in step S12 in FIG. 13. When the flow is triggered, step S42 involves a check as to whether there has been a predetermined pattern of taps on the cellular telephone 2 for a startup. This check is executed by a cross-check of the detected pattern obtained by the acceleration sensor 44 with a detected pattern table. In the case where the predetermined pattern of taps is not detected in step S42, the flow proceeds to step S44, in which there is a check as to whether there has been an incoming call to the cellular telephone 2. When no incoming call is detected, the flow proceeds to step S46.

Step S46 involves a check as to whether a predetermined acceleration has been detected by the acceleration sensor 44. Even in the power-saving mode, the acceleration sensor 44 is always activated, although in a state where the check period is slow, and it is possible to detect acceleration. When acceleration is detected in step S46, the flow proceeds to step S48, in which the infrared-beam-emitting units 12, 35 and the infrared-beam-receiving sensors 6, 37 are activated. On the front surface, the reason why the light-emitting unit 12 in particular is activated is the proximity thereof to the infrared-light-receiving sensor 6, endowing a close contact detection function similar with respect to the back surface infrared-light-emitting unit 35. In step S50, the back surface camera 42 is turned on. In step S52, the outputs of the infrared-beam-receiving sensor 6 of the front surface, the back surface infrared-light-receiving sensor 37, and the back surface camera 42 are stored, and the flow proceeds to step S54.

Step S54 involves detecting, with the side surface electrostatic sensor 49, whether the cellular telephone 24 is being retained by the hand of the operator. When there is no detection, the flow proceeds to step S56, in which there is a check as to whether the outputs of both the infrared-light-receiving sensor 6 of the front surface and the back surface infrared-light-receiving sensor 37 are at or below a predetermined value. This signifies that there is a check as to whether the state is such that neither the front surface nor the back surface of the cellular telephone 2 are in proximity to a surface that would cause there to be more intensely reflected light from the infrared-beam-emitting units 12, 35.

When the check in step S56 is not affirmative, the significance is that at least the front surface or back surface of the cellular telephone 2 is in proximity to some kind of surface; the flow therefore proceeds to step S58, in which there is a check as to whether the output of the infrared-light-receiving sensor 6 of the front surface has changed by a predetermined amount or more from the output stored in step S52. This signifies that there is a check as to whether the cellular telephone 2 has moved from some sort of surface in proximity to the front surface of the cellular telephone 2. When the check in step S58 is also not affirmative, there is the possibility that the state is such that the front surface of the cellular telephone 2 remains placed on some kind of surface; the flow therefore proceeds to step S60, in which there is a check as to whether the output of the back surface infrared-light-receiving sensor 37 has changed by a predetermined amount or more from the output stored in step S52. This signifies that there is a check as to whether the cellular telephone 2 has moved from some sort of surface in proximity to the back surface of the cellular telephone 2.

When the check in step S60 is also not affirmative, there is the possibility that the state is such that the back surface of the cellular telephone 2 remains placed on some kind of surface; the flow therefore proceeds to step S62, in which there is a check as to whether the output of the back surface camera 42 has changed by a predetermined amount or more from the output stored in step S52. This also signifies that there is a check as to whether the cellular telephone 2 has moved from some sort of surface in proximity to the back surface of the cellular telephone 2. When the check in step S62 is also not affirmative, there is the possibility that the state is such that the back surface of the cellular telephone 2 remains placed on some sort of surface; the flow therefore proceeds to step S64.

In step S64, there is a check as to whether a predetermined period of time has elapsed since the initial acceleration in step S46 was detected. When the period of time has not elapsed, the flow proceeds to step S68, in which there is a check as to whether the acceleration detection by the acceleration sensor 44 has persisted. In the case where the acceleration detection has persisted, the flow returns to step S54, following which steps S54 to S68 are repeated during an interval until the predetermined period of time has elapsed so long as the acceleration detection persists, in anticipation of the state where any of steps S54 to S64 is affirmative. On the other hand, when it is confirmed in step S68 that the acceleration detection has not persisted, the flow transitions to step S70. When, in step S64, the predetermined period of time has elapsed, the interpretation is that the cellular telephone 24 has remained in close contact with some sort of surface even though the acceleration detection has persisted, and the repetition of steps S54 to S68 is halted, the flow then transitioning to step S70.

In step S70, the infrared-beam-emitting units 12, 35 and the infrared-beam-receiving sensor 6, 37 are inactivated, and in step S72, the back surface camera 42 is turned off; the flow is then terminated. On the other hand, when the predetermined pattern of taps is detected in step S42, or when an incoming call is detected in step S44, then in step S74 the infrared-beam-emitting units 8, 10, 12, 35 and the infrared-beam-receiving sensors 6, 37 are activated, and the flow proceeds to step S76, in which cellular telephone 2 is immediately returned to the startup mode. The reason therefor is that such cases are confirmations of a state where the cellular telephone 2 should be started up. The flow is then terminated by way of step S72. In such a case, however, the back surface camera 42 remains off as before, and therefore nothing occurs in step S72.

On the other hand, when an affirmative state occurs in any of step S54 to S64, the flow proceeds directly to step S76, which returns the cellular telephone 2 directly to the startup mode. Then, the back surface camera 42, which had been turned on in step S50, is turned off in step S72, and the flow terminates. When, as above, the predetermined acceleration is detected in step S46, and also the acceleration is interpreted by the checks in steps S54 to S64 has having occurred due to the cellular telephone 2 being lifted, the cellular telephone 2 is automatically returned to the startup mode. When the state is not affirmative in steps S54 to S64, even though the acceleration may have been detected in step S46, the interpretation is that some sort of acceleration was applied merely in the state where the cellular telephone 2 had been placed on a desk or vehicle seat or in the state where the cellular telephone 2 had been placed in a pocket, and thus that no startup was intended. Startup is then prohibited.

In the case where the flow of FIG. 14 is terminated while startup remains prohibited, then, as is clear from FIG. 13, the flow returns from step S14 to step S12, and therefore the execution of the flow of FIG. 14 is repeated. Mistaken startup is thereby prevented, and startup in accordance with a variety of different situations is executed.

Figure 15:
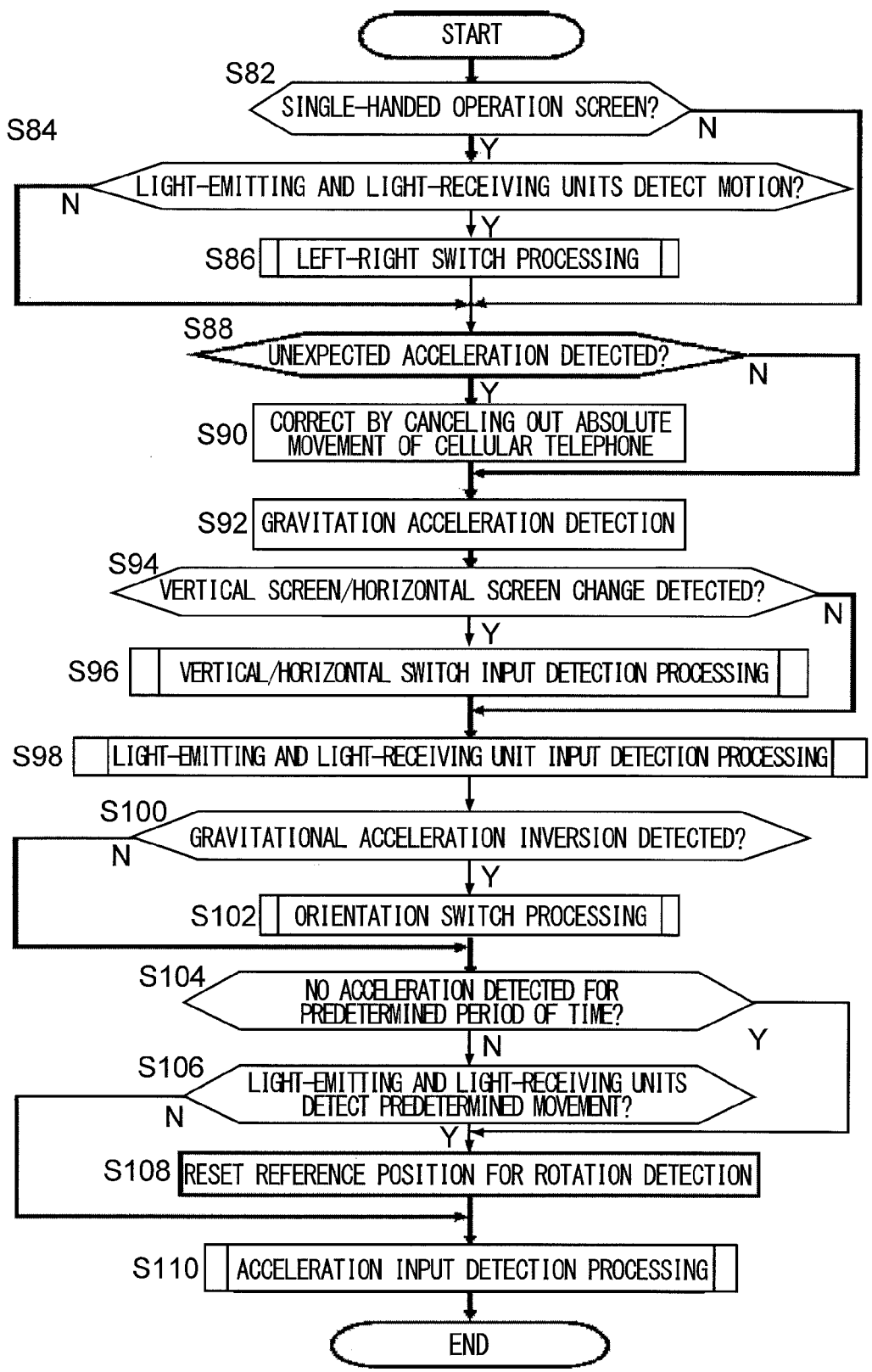
FIG. 15 is a flow chart providing a detailed illustration of step S26 in FIG. 13.

FIG. 15 is a flow chart providing a detailed illustration of the input detection processing in step S26 in FIG. 13. When the flow is triggered, there is a check in step S82 as to whether the display of the display unit 4 at the present time is the screen for single-handed operation. When the display is the screen for single-handed operation, then the flow proceeds to step S84, in which there is a check as to whether a movement of a hand or finger has been detected by the light-emitting and light-receiving units. Whenever there is any kind of detection, the flow proceeds to step S86, in which there is processing for switching the screen of the display unit 4 to the screens for right handed operation, as in FIG. 1, or for left-handed operation, as in FIG. 2, on the basis of the detected movement. Upon the execution of a left-right switch in accordance with need, the flow transitions to step S88. When no movement of a hand or finger is detected by the light-emitting and light-receiving units at the stage of step S84, the flow transitions directly to step S88. The flow also transitions directly to step S88 when there is a confirmation in step S82 that the display state is not that of a single-handed operation screen.

In step S88, there is a check as to whether an acceleration having a pattern other than what is expected for input detection has been detected. Then, when such an acceleration is detected, a correction for canceling out the absolute movement of the cellular telephone 2 is performed, and the flow transitions to step S90. The significance of step S90, as has already been described, is a countermeasure against the case where the detection input of the light-emitting and light-receiving units includes the influence of the hand-held cellular telephone 2 shaking, the detection input then not accurately reflecting the intention of moving the finger or hand. In other words, an unexpected acceleration, when detected, is determined to be the cellular telephone 2 experiencing unintended shaking along with the finger or hand being moved, and the absolute movement of this shaking is canceled out, whereby a correction is made to a detection output when a finger or hand is moved relative to a cellular telephone 2 that is not shaking. Comfortable input which reflects intention is thereby possible. As has already been described, this correction to cancel out the movement of the cellular telephone 2 involves a study of the unique, individually different shaking of the cellular telephone 2 when the finger or hand is moved is studied, and such studied information is also taken into consideration, instead of merely the information on the absolute detected movement. When no unexpected acceleration is detected in step S88, the flow transitions directly to step S92.

In step S92, the gravitational acceleration is detected, and in step S94 there is a check as to whether the screen of the cellular telephone 2 has changed between a vertical screen and a horizontal screen, on the basis of the detection output. When there has been a change, vertical/horizontal switching input detection processing is performed in step S96, and then the flow transitions to step S98. A more detailed description of the vertical/horizontal switching input detection process shall be provided below. On the other hand, when there is no detection in step S94 of a change between a vertical screen and a horizontal screen, the flow transitions directly to step S98. In step S98, input detection is performed using the light-emitting and light-receiving units in consideration of the above processing.

Subsequently, in step S100, the presence or absence of gravitational acceleration inversion is detected. This step is performed to see whether or not the gravitational acceleration has been inverted between the state where the display unit 4 is looked down on from above, as is normal, and the state where the display unit 4 is looked up at from below, as when lying down; when an inversion in the gravitational acceleration is detected, orientation switching processing is performed in step S102, and then the flow transitions to step S104. On the other hand, in the case where no inversion of gravitational acceleration is detected in step S100, the flow transitions directly to step S104.

In step S104, there is a check as to whether the state is such that the portable telephone 2 has come to a stop with no acceleration being detected for a predetermined period of time. When the check is not affirmative, the flow proceeds to step S106, in which there is a detection as to whether the light-emitting and light-receiving units have detected a predetermined movement of the finger or hand. The predetermined movement is, for example, a comparatively simply operation, such as one where the finger or hand traverses over the display unit 4 once. Then, when this movement is detected in step S106, the flow proceeds to step S108, in which the reference position for rotation detection is reset and stored, and the flow transitions to step S110. The flow also transitions to step S108 when, because the cellular telephone 2 has been stationary for a predetermined period of time or longer, acceleration for the predetermined period or longer is not detected in step S104, the reference position for rotation detection then being reset to the stationary position and stored. In this manner, resetting and storing can occur automatically whenever the cellular telephone 2 is stationary for the predetermined period of time, and, when there is shaking such that the finger or hand moves across the display unit 4 prior to the passage of the predetermined period of time, the reset and storing can occur automatically.

The significance of step S108, as has already been described, lies in obviating the need to necessarily make an absolute horizontal state into the reference position in the case where, for example, the thick-framed cursor 60 is moved over the menu in FIG. 10. In other words, when, in step S108 the reference position for rotational direction is reset when the display unit 4 is at a predetermined angle, and the gravitational acceleration at the time is stored in the storage unit 40, then afterward the rotation of the cellular telephone 2 will be detected through a comparison of the newly detected gravitational acceleration referring to this stored value. On the other hand, the flow transitions directly to step S110 when no stationary state is detected in S104 and the predetermined movement is not detected by the light-emitting and light-receiving units in step S106. In step S110, the detection from the acceleration sensor 44 is inputted with consideration given to the above processing, and the flow is terminated. The light-emitting and light-receiving unit input detection information from step S98 in FIG. 15 and the acceleration input detection information from step S110 are the original information of the input support processing in step S30 of FIG. 13.

Figure 16:
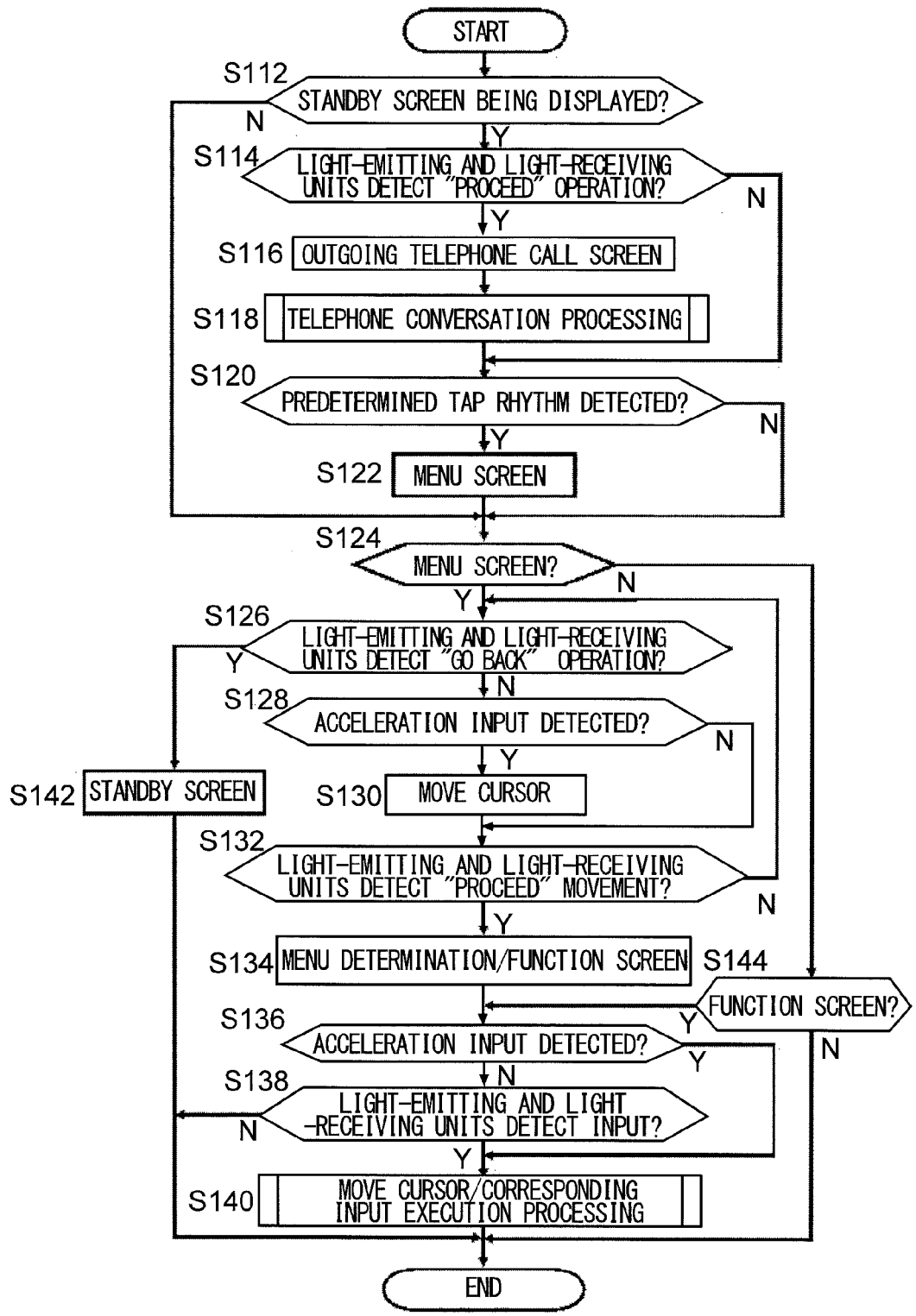
FIG. 16 is a flow chart providing a detailed illustration of step S30 in FIG. 13.

FIG. 16 is a flow chart providing a detailed illustration of the input support processing in step S30 in FIG. 13. When the flow is triggered, there is a check in step S112 as to whether the display of the display unit 4 at the present time is the standby screen as in FIG. 1 or 2. When the display is the standby screen, the flow proceeds to step S114, in which there is a check as to whether a finger movement for a "PROCEED" operation has been detected by the light-emitting and light-receiving units. When this has been detected, the flow transitions to an outgoing telephone call screen in step S116. This corresponds to the operation described in FIG. 7. Subsequently, conversation processing of step S118 is switched on. When either a conversation takes place from the outgoing call and is then terminated, or the execution of the conversation is interrupted, and the conversation processing is terminated, then the flow transitions to step S120. When a "PROCEED" operation is not detected in step S114, then the flow transitions directly to step S120.

In step S120, there is a check by the acceleration sensor 44 as to whether the cellular telephone 2 has been tapped a plurality of times with a predetermined rhythm. When this is detected, the flow proceeds to step S122, in which a change to a menu screen is performed, and then proceeds to step S124. This corresponds to the operation described in FIG. 9. On the other hand, in the case where the rhythm of the predetermined number of taps is not detected in step S120, the flow transitions directly to step S124. The flow also transitions directly to step S124 when it is not possible to detect in step S112 that the standby screen is being displayed at the present moment.

In step S124, there is a check as to whether the display of the display unit 4 at the present moment is the menu screen as in FIG. 9. When the display is the menu screen, the flow proceeds to step S126, in which there is a check as to whether a "GO BACK" operation has been detected by the light-emitting and light-receiving units. Then, when this operation is not detected, the flow proceeds to step S128, in which there is a check as to whether an input acceleration has been detected by the cellular telephone 2 being tilted. When there is a detection, the flow proceeds to step S130, in which the cursor is moved in the detection direction, and the flow transitions to step S132. On the other hand, when no acceleration input is detected in step S128, the flow transitions directly to step S132. In step S132, there is a check as to whether a "PROCEED" operation has been detected by the light-emitting and light-receiving units.

When a "PROCEED" operation is detected in step S132, the menu is decided in step S134, and the display proceeds to the function screen corresponding to the menu that has been decided on. This corresponds to the operation described in FIG. 11 or FIG. 12. On the other hand, when no "PROCEED" operation is detected in step S132, the flow returns to step S126, and thereafter steps S126 to S132 are repeated until a "GO BACK" operation or a "PROCEED" operation is detected. Meanwhile, the cursor can be moved as desired using steps S128 and S130.

When the display proceeds to the function screen in step S134, then in the following step S136, there is a check for the presence or absence of an acceleration input detection by the acceleration sensor 44. In a case where there is no detection, the flow proceeds to step S138, in which there is a check for the presence or absence of a light-emitting and light-receiving unit input detection. When herein a detection is confirmed, the flow proceeds to step S140, in which an operation in accordance with the cursor movement or corresponding input is executed in accordance with the detection input. The flow also proceeds to step S140 when an acceleration is detected in step S136; then, an operation in accordance with the cursor movement or corresponding input is executed in accordance with the detection input. In this manner, due to the functions of steps S136 to S140, a specific input corresponding to each of the acceleration input and the light-emitting and light-receiving unit input is possible, and it becomes possible to perform the same input with either one of the acceleration input and the light-emitting and light-receiving unit input as with the cursor movement in FIGS. 3 and 11B.

The flow terminates when the cursor movement or corresponding input execution processing of step S140 is completed. The flow also terminates when no light-emitting and light-receiving unit input is detected in step S138. Further, when a "GO BACK" operation is detected in step S126, the screen returns to the standby screen in step S142, whereupon the flow terminates. When, in step S124, the display is not that of the menu screen, the flow proceeds to step S144, in which there is a check as to whether the display is a function screen. When the display is a function screen, the flow transitions to step S136, in which the flow for acceleration detection is switched on. On the other hand, when the display is not a function screen in step S144, the flow is immediately terminated, since the meaning is that the standby screen is being displayed.

Figure 17:
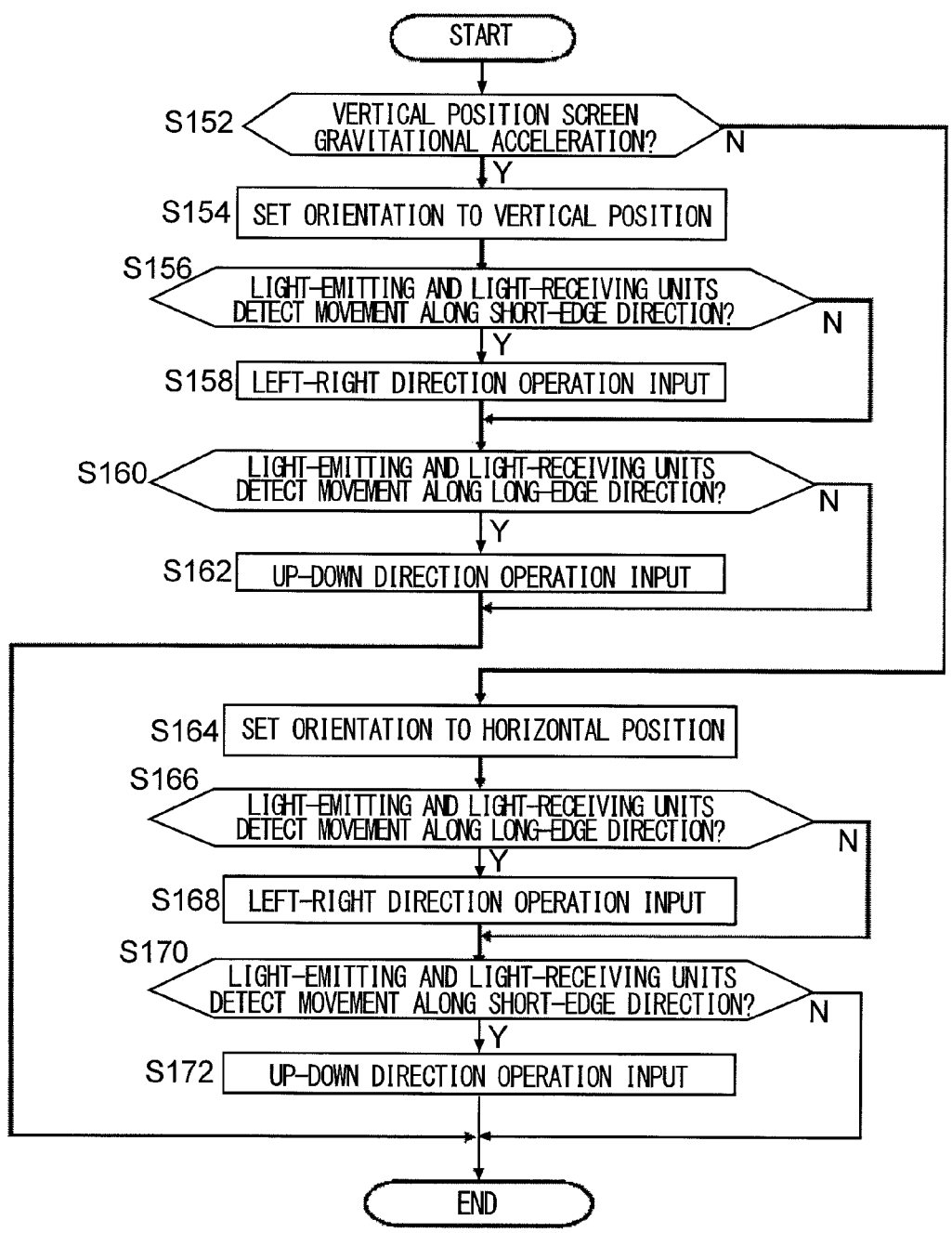
FIG. 17 is a flow chart providing a detailed illustration of step S96 in FIG. 15.

FIG. 17 is a flow chart providing a detailed illustration of the vertical/horizontal switching input detection processing in step S96 of FIG. 15. When the flow is triggered, there is a check in step S152 as to whether gravitational acceleration in a state where the screen is vertically positioned has been detected. When the gravitational state is of vertical positioning, the flow proceeds to step S154, in which the orientation is set to a vertical position. This is because when the orientation has been inverted in the same vertical position, the light-emitting and light-receiving unit detection output will be different. Then, in step S156, there is a check as to whether the light-emitting and light-receiving units have detected the movement of a hand or finger in the short-edge direction of the screen. When a corresponding movement is detected, the flow proceeds to step S158, in which input is performed together with the horizontal detection direction, as a horizontal direction operation, and then the flow transitions to step S160. On the other hand, when no corresponding detection occurs in step S156, the flow transitions directly to step S160.

In step S160, there is a check as to whether the light-emitting and light-receiving units have detected the movement of a hand or finger in the long-edge direction of the screen. When an affirmative movement is detected, the flow proceeds to step S162, in which input is performed together with the vertical detection direction, as a vertical direction operation, and then the flow is terminated. On the other hand, the flow is terminated directly when, in step S156, no affirmative detection occurs.

By contrast, in the case where gravitational acceleration in a state where the screen is vertically positioned is not detected in step S152, the flow transitions to step S164, since the meaning is that the state is one of a horizontally significant screen, and the orientation is set to a horizontal position. In step S166, there is a check as to whether the light-emitting and light-receiving units have detected the movement of a hand or finger in the long-edge direction of the screen. When an affirmative movement is detected, the flow proceeds to step S168, in which input is performed together with the horizontal detection direction as a horizontal direction operation, and then the flow transitions to step S170. On the other hand, when no affirmative detection occurs in step S166, the flow transitions directly to step S170.

In step S170, there is a check as to whether the light-emitting and light-receiving units have detected movement of a hand or finger in the short-edge direction. When an affirmative movement is detected, the flow proceeds to step S172, in which input is performed together with the vertical detection direction as a vertical direction operation, and then the flow is terminated. On the other hand, the flow is directly terminated when no affirmative detection occurs in step S170.

As described above, in the flow of FIG. 17, a movement of the finger or hand in the horizontal direction is processed integrally as horizontal direction input and a movement of the finger or hand in the vertical direction is processed integrally as vertical direction input, irrespective of whether the screen is in a vertically positioned state or a horizontally positioned state. This is a countermeasure against, for example, the tendency for input as vertical direction movement in the horizontally positioned state, despite the inputted movement being left-right when the screen is in the vertically positioned state, when the position of the infrared-beam-emitting units 8, 10, 12 and the infrared-beam-receiving sensor 6 is rotated 90° and a finger or hand is moved in the horizontal direction, as is clear from a comparison between the state of FIGS. 1 to 4 and the state of FIG. 5.

Figure 18:
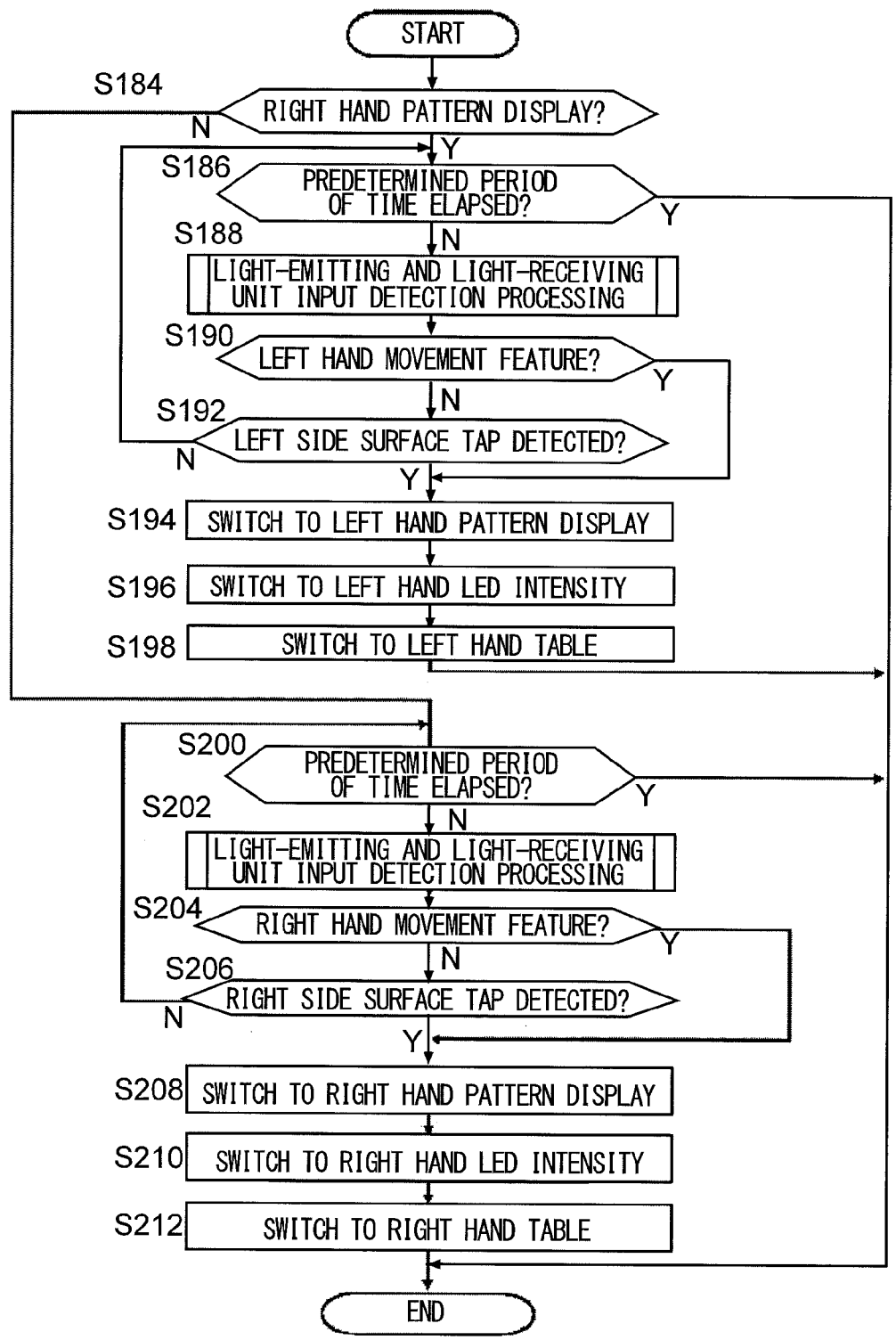
FIG. 18 is a flow chart providing a detailed illustration of step S18 in FIG. 13 and step S86 in FIG. 15.

FIG. 18 is a flow chart providing a detailed illustration of the left-right switching processing in step S18 of FIG. 13 and step S86 of FIG. 15. When the flow is triggered, in step S184 there is a check as to whether a right-handed pattern is being displayed. When a right-handed pattern is being displayed, the flow proceeds to step S186, in which there is a check as to whether a predetermined period of time has elapsed since the light-emitting and light-receiving units detected movement. When the predetermined period of time has not yet elapsed, the flow proceeds to step S188, in which light-emitting and light-receiving unit input detection processing is performed. This processing is similar to step S98 of FIG. 15, but a more detailed description thereof shall be provided below.

Then, in step S190, there is a check as to whether the feature of a left hand movement has been detected, on the basis of the detection processing in step S188. This is a movement characteristic of a case where, for example, the finger is waved from the base of the thumb when the cellular telephone 2 is held in the left hand and the thumb thereof is moved. When no detection has occurred, the flow proceeds to step S192, in which there is a check as to whether the left side surface of the cellular telephone 2 has been tapped. This corresponds to an acceleration detection when, for example, the cellular telephone 2 is held in the left hand and the cellular telephone 2 is tapped with the thumb thereof. The flow transitions to step S194 when the acceleration of such a tap is detected in step S192. The flow also transitions to step S194 when, in step S190, the feature of a left hand movement has been detected. On the other hand, the flow returns to step S186 when no left side surface tap is detected in step S192, followed by a wait for either a movement specific to the left hand to be detected or for the left side surface to be tapped, until the predetermined period of time has elapsed. Due to this configuration, the flow can automatically transition to step S194 through the detection of a left hand movement, and, when the detection is imperfect, the flow can immediately transition to step S194 due to a left hand thumb tap.

As above, when a left hand operation is detected and the flow proceeds to step S194 and onward, the display is firstly switched to a left-handed pattern in step S194. This signifies that the display of the display unit 4 is switched, for example, from the state of FIG. 1 to the state of FIG. 2. In step S196, a switch to left-handed LED intensity is performed. This corresponds to, for example, a switch for increasing the intensity of light emitted from the light-emitting unit 12 over that of the light-emitting unit 10 in the state of FIG. 2, from the setting in FIG. 1 such that the intensity of light emitted from the light-emitting unit 10 is greater than that of the light-emitting unit 12. This is a switch such that the intensity of the light-emitting unit farther from the base of the thumb is greater than the intensity of the light-emitting unit in the vicinity of the base of the thumb of the operating hand. Further, in step S198, the movement detection pattern is switched to left-handed usage. This corresponds, for example, to switching the detection pattern for detecting that a thumb has been moved clockwise along the "PROCEED" finger trajectory instruction mark 18 in FIG. 1 to a detection pattern for detecting that a thumb has been moved counterclockwise along the "PROCEED" finger trajectory instruction mark 18 in FIG. 2. Then, the flow is terminated when this processing is completed. The flow is also terminated when the predetermined period of time has elapsed in step S186. This corresponds to a case where the cellular telephone 2 has been held in the right hand in the right hand pattern display and there is no need for a left-right switch.

On the other hand, in the case where a right hand pattern is not being displayed in step S184, the flow transitions to step S200, since the meaning is that the left hand pattern is being displayed. The operations of step S200 onward when the left hand pattern is being displayed are fundamentally identical to step S186 when the right hand pattern is being displayed. Specifically, firstly, there is in step S200 a check as to whether a predetermined period of time has elapsed since the light-emitting and light-receiving units first detected movement. When the predetermined period of time has not yet elapsed, the flow proceeds to step S202, in which light-emitting and light-receiving unit input detection processing is performed. Then, in step S204, there is a check as to whether the feature of a right hand movement has been detected, on the basis of the detection results. When no detection has occurred, the flow proceeds to step S206, in which there is a check as to whether the right side surface of the cellular telephone 2 has been tapped. The flow transitions to step S208 when the acceleration of such a tap is detected. The flow also transitions to step S208 when, in step S204, the feature of a right hand movement has been detected. On the other hand, the flow returns to step S200 when no right side surface tap is detected in step S206, followed by a wait for either a movement specific to the right hand to be detected or for the right side surface to be tapped, until the predetermined period of time has elapsed.

In step S208, the display is switched to a right hand pattern. In step S210, there is a switch to a right-handed LED intensity. Further, in step S212, the movement detection pattern is switched to right hand usage. Then, the flow is terminated when this processing is completed. The flow is also terminated when the predetermined period of time has elapsed in step S200. This corresponds to the case where the cellular telephone 2 is held in the left hand in the left hand pattern display and there is no need for a left-right switch.

Figure 19:
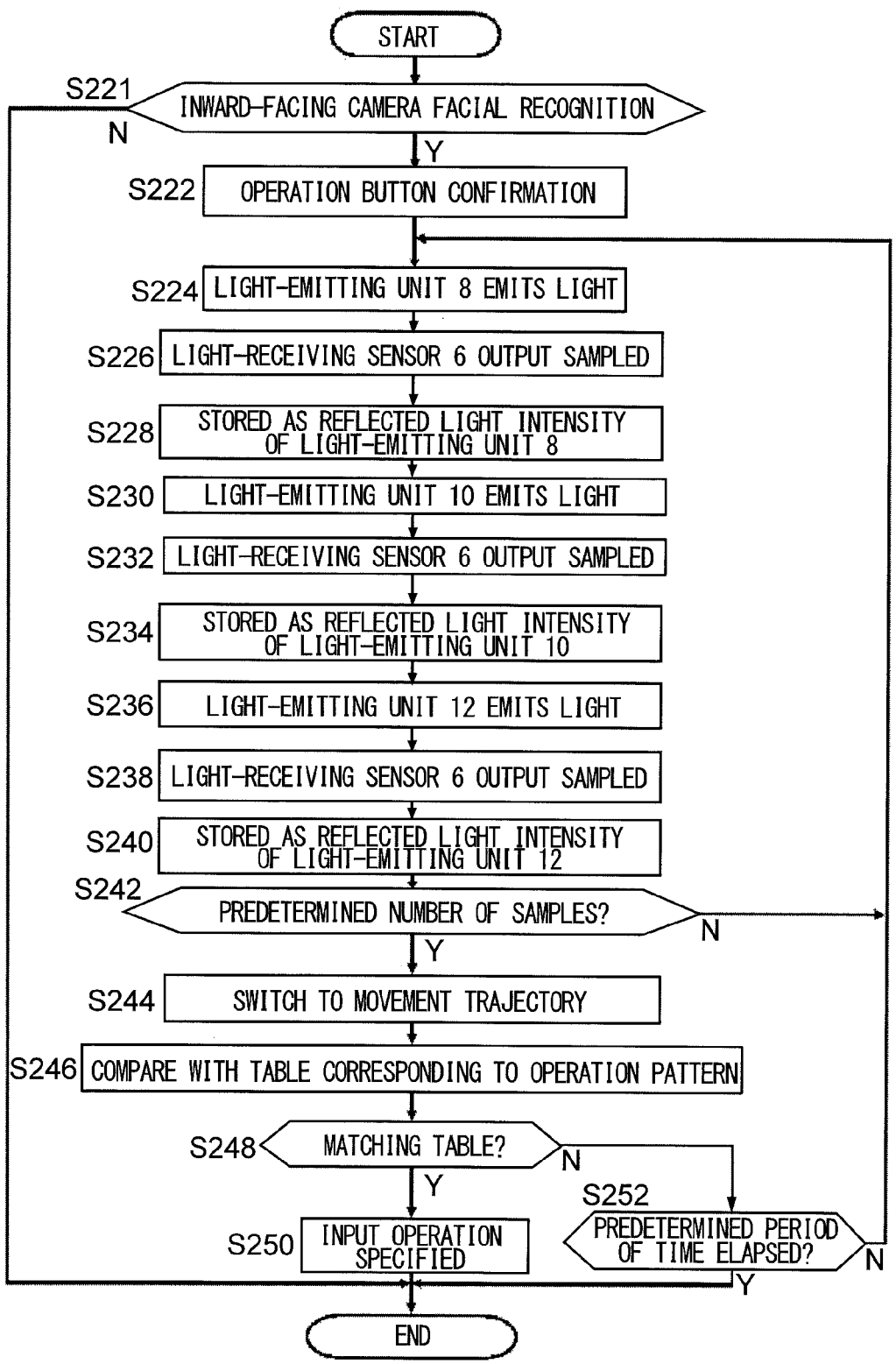
FIG. 19 is a flow chart providing a detailed illustration of steps S98 and S202 in FIG. 15 and step S188 in FIG. 18.

FIG. 19 is a flow chart providing a detailed illustration of the light-emitting and light-receiving unit input detection processing in step S98 of FIG. 15 and steps S188 and S202 of FIG. 18. When the flow is triggered, firstly, there is in step S221 a check as to whether a face has been recognized on the basis of the image processing of the image of the inward-facing camera 13. Then, when a face can be recognized, the flow transitions to step S222 and beyond, whereas the flow is immediately terminated in a case where a face cannot be recognized. This, as has already been described, is intended to prevent a mistaken operation in the case where a hand or the like crosses over the display surface 4 unintentionally when no operation is intended, the configuration being such that unless the face of an operator viewing the display unit 4 can be detected, no operation can be inputted by the infrared-beam-receiving sensor 6 and the infrared-beam-emitting units 8, 10, 12.

When a face can be detected and the flow proceeds to step S222, an operation pattern is confirmed. Then, in step S224 the light-emitting unit 8 is made to emit light, and in step S226 the output of the light-receiving sensor 6 is sampled in order to detect the presence, absence, or intensification of the reflected light thereof. The results are stored in the following step S228 as the reflected light intensity of the light-emitting unit 8. The reflected light intensity is essentially zero when there is no finger, hand, or the like over the display unit 4.

Next, in step S230 the light-emitting unit 10 is made to emit light, and in step S232 the output of the light-receiving sensor 6 is sampled in order to detect the presence, absence, or intensity of the reflected light thereof. The results are stored in the following step S234 as the reflected light intensity of the light-emitting unit 10. Further, in step S236 the light-emitting unit 12 is made to emit light, and in step S238 the output of the light-receiving sensor 6 is sampled in order to detect the presence, absence, or intensity of the reflected light thereof. The results are stored in the following step S240 as the reflected light intensity of the light-emitting unit 12. Because the light-emitting units 8, 10, and 12 are made to emit light in time division as described above, the light-emitting unit to which the reflected light intensity outputted by the light-receiving sensor 6 belongs is ascertained on the basis of the timing thereof Next, in step S242, there is a check as to whether it has been possible to obtain, from the reflected light detection in the aforesaid time division, a predetermined number of samples over time needed to determine the movement trajectory of a finger or the like. Then, when the predetermined number of samples is not met, the flow returns to step S224, following which steps S224 to S242 are repeated until the predetermined number of samples is detected in step S242. When it is confirmed in step S242 that the predetermined number of samples has been obtained, then in step S244 the samples are converted to a movement trajectory, which in step S246 is compared with a table corresponding to operation patterns. Then, in step S248 there is a check as to whether there is a table matching the detected movement trajectory; when there is a matching table, an input operation is specified in step S250 on the basis thereof, and the flow is terminated. When there is no matching table in step S248, the flow proceeds to step S252, in which there is a check as to whether a predetermined period of time has elapsed. When the predetermined period of time has not elapsed, the flow returns to step S224, following which steps S224 to S252 are repeated until either the predetermined period of time elapses or an input is specified.

The following provides an overarching description of the technical features disclosed by the present invention.

<First Technical Feature>

A first technical feature disclosed in the present specification provides a mobile device comprising: an acceleration detection unit for detecting acceleration relative to the device; a state identification unit for identifying a first state and a second state; and a power supply controller for beginning to supply power to the device when the acceleration detection unit has detected acceleration and the state identification unit has identified the first state, and for not beginning to supply power to the device when the state identification unit has identified the second state, even when the acceleration detection unit has detected acceleration. It is thereby possible to automatically begin to supply power to the device by picking up and holding the mobile device or through another operation, and also thereby possible to prevent a mistaken power supply based on detection of an unintended acceleration. According to a specific feature, the state identification unit has a light-emitting unit and a light-receiving unit capable of receiving the reflected light of the light of the light-emitting unit, and identifies the first state and the second state in accordance with the light-receiving state of the light-receiving unit.

According to a further specific feature, the state identification unit identifies the first state when the output of the light-receiving unit is at or below a predetermined level, and identifies the second state when this is not true. Because the question of whether the output of the light-receiving unit is at or below the predetermined level is dependent on whether the mobile device is in proximity to an object that would reflect the light of the light-emitting unit, the ability to make this identification makes it possible to automatically begin to supply power to the device by picking up and holding the mobile device or through another operation, and also makes it possible to prevent a mistaken power supply based on detection of an unintended acceleration.

According to another further specific feature, the state identification unit identifies the first state when the change in output of the light-receiving unit is at or above a predetermined level, and identifies the second state when this is not true. Because the question of whether the change in output of the light-receiving unit is at or above the predetermined level is dependent on whether the mobile device has been moved in such a manner that the distance from an object that would reflect the light of the light-emitting unit changes, the ability to make this identification makes it possible to automatically begin to supply power to the device by picking up and holding the mobile device or through another operation, and also make it possible to prevent a mistaken power supply based on detection of an unintended acceleration.

According to another further specific feature, the light-emitting unit and the light-receiving unit are arranged so as to be in close proximity to each other on the back surface or front surface of the mobile device. It is thereby possible to identify whether an acceleration has been detected due to the mobile device being lifted from a desk or the like or, rather, an acceleration has been detected while the mobile device remains in a state of being placed on a desk or the like. It is also thereby possible to automatically begin to supply power to the device by picking up and holding the mobile device or through another operation, and also possible to prevent a mistaken power supply based on detection of an unintended acceleration.

According to another further specific feature, a camera unit is provided, and the state identification unit has a light-emitting unit for emitting light such that the camera unit can receive reflected light, thus identifying a first state when the change in output of the camera unit is at or above a predetermined level and a second state when this is not true. Because the question of whether the change in output of the camera unit is at or above the predetermined level is dependent on whether the mobile device has been moved in such a manner that the distance from an object that would reflect the light of the light-emitting unit changes, the ability to make this identification makes it possible to automatically begin to supply power to the device by picking up and holding the mobile device or through another operation, and also makes it possible to prevent a mistaken power supply based on detection of an unintended acceleration. Such an identification can be made through the utilization of the camera unit, which is inherently already provided with the ability to receive light.

According to another further specific feature, the light-emitting unit emits infrared light. This allows the light-receiving unit or camera unit to receive reflected light based on the light emitted from the light-emitting unit without there being any confusion with natural light, and makes it possible to identify the first state and the second state in accordance with the light-receiving state of the light-receiving unit.

According to another further specific feature, the light-emitting unit begins to emit light due to the acceleration sensor detecting acceleration. It is thereby possible to detect acceleration without losing energy due to needless emission of light, and to automatically emit light whenever the need arises to identify the first state and the second state, in accordance with the light-receiving state of the light-receiving unit.

According to another specific feature, the power supply controller halts power supply to the device when the mobile device is not operated for a predetermined period of time or longer. It is thereby possible to automatically halt power supply at times when the mobile device is interpreted as not being in use. It is also thereby possible to automatically begin supplying power to the device due to an operation interpreted as being intended, such as where the mobile device is lifted, and to prevent mistaken power supply based on detection of an unintended acceleration and to maintain the state where power supply is halted.

According to another specific feature, the state identification unit identifies the first state when the acceleration detected by the acceleration detection unit conforms to a predetermined pattern, and identifies the second state when this is not true. It is thereby possible to automatically begin supplying power to the device due to an acceleration applied with the intention of using the mobile device, and to prevent mistaken power supply based on detection of an unintended acceleration.

According to another specific feature, the state identification unit has a contact detector for detecting contact made with the device by a human body, and identifies the first state when the contact detector detects the contact of a human body, and identifies the second state when this is not true. It is thereby possible to automatically begin supplying power to the device due to an acceleration accompanying the contact of a human body, such as where the mobile device is lifted, and to prevent mistaken power supply based on detection of an unintended acceleration.

According to another specific feature, there is also a contactless input unit operating by detecting movement around the device using a light-emitting unit and a light-receiving unit capable of receiving reflected light of the light of the light-emitting unit, where the state identification unit identifies the first state and the second state in accordance with the light-receiving state in the mentioned light-receiving unit of the contactless input unit. Thus, through the use of a contactless input unit which inherently already is provided with the ability to receive light, it is possible to automatically begin supplying power to the device due to the acceleration accompanying the contact of a human body, such as when the mobile device is lifted, and it is also possible to prevent mistaken power supply based on detection of an unintended acceleration.

According to another feature, provided is a mobile device having: a contactless input unit operating by detecting movement around the device using a light-emitting unit and a light-receiving unit capable of receiving reflected light of the light of the light-emitting unit; an acceleration detection input unit for detecting acceleration relative to the device; and a power supply controller for deciding whether or not to begin supplying power to the device according to a combination of an output of the light-receiving unit in the contactless input unit with the acceleration detection of the acceleration detection unit input unit. This feature allows for suitable control of the power supply in part in that it is possible to automatically begin supplying power to the device due to the acceleration accompanying the contact of a human body, such as when, for example, the mobile device is lifted, according to a combination of an output of the light-receiving unit in the contactless input unit with the acceleration detection of the acceleration detection unit input unit, and it is also possible to prevent mistaken power supply based on detection of an unintended acceleration.

According to a specific feature, the power supply controller begins to supply power to the device when the acceleration detection unit detects acceleration and the output of the light-receiving unit is at or below a predetermined level, and does not begin to supply power to the device when, even though the acceleration detection unit has detected the acceleration, the output of the light-receiving unit is not at or below the predetermined level. According to another specific feature, the power supply controller begins to supply power to the device when the acceleration detection unit detects acceleration and the change in output of the light-receiving unit is at or above a predetermined level, and does not begin to supply power to the device when, even though the acceleration detection unit has detected the acceleration, the change in output of the light-receiving unit is not at or above the predetermined level.

According to another feature, provided is a mobile device having: an acceleration detection unit for detecting acceleration relative to the device; and a power supply controller for beginning to supply power to the device when acceleration detected by the acceleration detection unit conforms to the predetermined pattern and for not beginning to supply power to the device when, even though the acceleration detection unit has detected the acceleration, the acceleration is not in the predetermined pattern. It is thereby possible to automatically begin supplying power to the device due to an acceleration applied with the intention of using the mobile device, and to prevent mistaken power supply based on detection of an unintended acceleration.

According to a specific feature, there is a state identification unit for identifying the state of the device, where the power supply controller decides whether or not to begin supplying power to the device according to a combination of the state identification results from the state identification unit with an acceleration detection of the acceleration detection unit, and begins to supply power to the device in preference to the aforesaid combination when the acceleration detected by the acceleration detection unit confirms to the predetermined pattern. Thus, the decision regarding the supply of power is made through a suitable estimation even when no acceleration conforming to the predetermined pattern is detected, and, when there is a clear intention to use the mobile device due to a detected acceleration of the predetermined pattern, power begins to be supplied to the device in preference thereto.

According to another feature, provided is a mobile device having: a contact detector for detecting a contact made with the device by a human body; an acceleration detection unit for detecting an acceleration relative to the device; and a power supply controller for beginning to supply power to the device when the acceleration detection unit detects an acceleration and the contact detector detects the contact of a human body, and for not beginning to supply power to the device when, even though the acceleration detection unit has detected the acceleration, the contact detector does not detect the contact of a human body. It is thereby possible to automatically begin supplying power to the device due to an acceleration accompanying the contact of a human body, such as where the mobile device is lifted, and to prevent mistaken power supply based on detection of an unintended acceleration.

According to a specific feature, there is a state identification unit for identifying the state of the device, where the power supply controller decides whether or not to begin supplying power to the device according to a combination of the state identification results from the state identification unit with an acceleration detection of the acceleration detection unit, and begins to supply power to the device in preference to the aforesaid combination when the acceleration detection unit detects an acceleration and the contact detector detects the contact of a human body. In this manner, the decision regarding the supply of power is made through a suitable estimation even when the contact of a human body is not detected, such as in the case where a portion other than the contact detector is held, and, when there is a clear intention to use the mobile device due to a contact detection, power begins to be supplied to the device in preference thereto.

As described above, according to the first technical feature disclosed in the present specification, there can be provided a user-friendly mobile device, in which it is possible to automatically begin supplying power to the device due to an operation such as where the mobile device is lifted, and possible to prevent mistaken power supply based on detection of an unintended acceleration.

<Second Technical Feature>

A second technical feature disclosed in the present specification provides a mobile device having: an acceleration detection unit for detecting acceleration relative to the device; a display screen; a movement detector for detecting the movement of a hand moved over the display screen; and input means for inputting on the basis of the movement detection by the movement detector and on the basis of the acceleration detection by the acceleration detection unit. Provided thereby is a user-friendly mobile device and has useful input means making use of the information of the movement detector and the acceleration detection unit.

According to a specific feature, the display screen is rectangular, having long sides and short sides; the input means detects, on the basis of the detection made by the acceleration detection unit, whether the mobile device is in a posture in either of a position such that the display screen is horizontal or a position such that the display screen is vertical, and the input means inputs a like associated meaning on the basis of the movement of a hand in a like direction, irrespective of the posture of the display screen, on the basis of the detection results.

In the mobile device having the rectangular display screen, the mobile device can be retained in a posture in either of a position such that the display screen is horizontal or a position such that the display screen is vertical, but the posture of the movement detector provided to the mobile device is also rotated 90° by such a change in posture. Accordingly, when there is a desire to input a like associated meaning by a movement of the hand, it becomes necessary to use movements of the hand that also differ by 90° in the cases of being horizontal and vertical, which confuses the user. The aforesaid specific feature is configured so as to prevent the occurrence of such a problem, in that the posture of the mobile device can be detected on the basis of the detection of the acceleration detection unit, a like associated meaning can be inputted on the basis of a movement of the hand in a like direction, irrespective of the posture.

According to a further specific feature, the input means inputs a like associated meaning on the basis of a movement of the hand in the horizontal direction over the display screen, irrespective of the posture of the display screen. According to yet another further specific feature, the input means inputs a like associated meaning on the basis of a movement of the hand in the vertical direction over the display screen, irrespective of the posture of the display screen.

According to another specific feature, the movement detector has an infrared-light-emitting unit, and infrared-light-receiving unit for receiving the infrared light of the infrared-light-emitting unit reflected from a hand being moved over the display screen. It is thereby possible to input with relation to the screen without the need to touch the screen directly, thus eliminating the need to worry about leaving fingerprints.

According to another specific feature, the input means updates a reference value for gravitational acceleration detection in accordance with a movement of the hand detected by the movement detector when inputting on the basis of an input acceleration detected by the acceleration detection unit. Provided thereby is a user-friendly mobile device and has input means thereby combining the movement detector with the acceleration detection unit.

According to yet another specific feature, the input means corrects the detection information of the movement detector with the information of the acceleration detection unit. Provided thereby is a user-friendly mobile device having input means combined with the movement detector in another aspect of the acceleration detection unit.

According to a further specific feature, the input means corrects by subtracting the information on the absolute movement of the mobile device [detected] by the acceleration detection unit from the information on the relative movement detection between the movement of the hand and the screen by the movement detector. The movement of a hand over the display screen, which is detected by the movement detector, is a relative movement between the display screen and the hand, but because the mobile device is retained in the hand, it is in some cases impossible to input as intended when there is an attempt to move the hand relative to the display screen, the display screen itself also shaking at the same time. By contrast, subtracting the information of the acceleration detection unit from the detection information of the movement detector as described above makes it possible to input comfortably as intended, the input being performed relative to a screen that is not shaking.

According to another feature, there is provided a mobile device having: an acceleration detection unit for detecting acceleration relative to the device; a display screen; input means for inputting on the basis of the display of the display screen and on the basis of an input acceleration detected by the acceleration detection unit; and updating means for updating the reference values of the gravitational acceleration needed for input.

In the case where the mobile device is tilted, the tilting being detected by the acceleration detection unit, and the display screen is operated, operation becomes inconvenient when the reference position of the mobile device is an absolute horizontal state. By contrast, when the updating means for the reference position is provided as described above, the reference position can be updated at any desired posture of the mobile device, whereafter input depending on the change in posture of the mobile device is possible on the basis of the updated reference positions. Accordingly, it is possible to prevent the occurrence of an unintentional input even after, for example, the body changes direction while the mobile device is being held.

According to a specific feature, the updating means constitutes determination means for determining that the gravitational acceleration detected by the acceleration detection unit has not changed for a predetermined period of time. According to yet another specific feature, the updating means is a movement detector for detecting the movement of a hand relative to the mobile device. Such updating means following the natural operations of a user handling a mobile device, and the input operation can be facilitated.

According to another feature, provided is a mobile device having: an acceleration detection unit for detecting acceleration relative to the device; a display screen; an infrared-light-emitting unit; an infrared-light-receiving unit for receiving the infrared light of the infrared-light-emitting unit reflected from a hand being moved over the display screen; and input means for inputting a first associated meaning with relation to the display screen on the basis of information from the acceleration detection unit and for inputting a second associated meaning with relation to the display screen on the basis of information from the infrared-light-receiving unit.

According to the aforesaid feature, the use of the information on the relative movement of a hand relative to the mobile device can be differentiated from the use of the information on the acceleration applied to the mobile device by the mobile device being tilted or tapped, whereby a plurality of associated meanings with relation to the display screen can be readily inputted by natural operations.

According to a specific feature, one of the first and second associated meanings is the selection of a selection item on the display screen, while the other is a decision of a selection. It is thereby possible to readily and naturally input without the need to touch the display screen, such as, for example, to select a selection item on the screen in accordance with gravity by tilting the mobile device, to decide the relevant selection by a movement of the hand over the display screen.

According to another feature, there is provided a mobile device having: an acceleration detection unit for detecting acceleration relative to the device; a display screen; an infrared-light-emitting unit; an infrared-light-receiving unit for receiving the infrared light of the infrared-light-emitting unit reflected from a hand being moved over the display screen; and input means for inputting a like associated meaning with relation to the display screen whenever there is either information from the acceleration detection unit or information from the infrared-light-receiving unit.

According to the above feature, when a like associated meaning with relation to the display screen is inputted, the input can be performed by the combined use of a relative movement of the hand relative to the mobile device and an operation for applying acceleration such as by tilting the mobile device. It is also possible to readily input a like associated meaning with a natural operation in accordance with the case.

According to a specific feature, the input means selects a selection item on the display screen whenever there is either information from the acceleration detection unit or information from the infrared-light-receiving unit. In such a case, a like associated meaning can be readily inputted to sequentially select selection items by a natural operation in accordance with the case, such as by the use of a movement of the hand when a selection is made while the mobile device is tilted and sprung to a removed position.

According to the second technical feature disclosed in the present specification as described above, there can be provided a mobile device in which input is readily performed.

<Third Technical Feature>

According to a third technical feature disclosed in the present specification, there is provided a mobile device having: a display screen; a movement detector for detecting the movement of a hand being moved over the display screen; a display controller for causing the display screen to display an instruction for a movement of a hand to be moved over the display screen; and a determination unit for determining whether the movement detector has detected a movement corresponding to the instruction being displayed on the display screen.

By the aforesaid feature, a desired movement of the hand can be accurately guided upon the determination of a movement of the hand. According to a specific feature, a predetermined input is performed on the basis of the determination of the determination unit; the aforesaid feature also makes it possible to accurately guide a movement of the hand for inputting the same.

According to another specific feature, the movement detector has an infrared-light-emitting unit, and an infrared-light-receiving unit for receiving the infrared light of the infrared-light-emitting unit reflected from a hand being moved over the display screen. It is thereby possible to input with relation to the screen without the need to touch the screen directly, thus eliminating the need to worry about leaving fingerprints. The aforesaid feature makes it possible to accurately guide an accurate movement of the hand in a case where the screen is not being directly touched.

According to another specific feature, the display controller causes the display screen to display the trajectory of a movement of a hand to be moved over the display screen. It is thereby possible to intuitively guide the movement of a hand. According to a further specific feature, the determination unit determines whether the movement detector has detected a movement along the trajectory displayed on the display surface.

According to a further specific feature, the display controller causes the display screen to display a direction of a movement of a hand to be moved along a trajectory over the display screen. The direction involved in moving the hand along the trajectory is thereby rendered clearer and the movement of the hand can thereby be more accurately guided. According to a further specific feature, the display controller causes the display screen to display the input of different meanings in accordance with directions of movement of a hand to be moved along the trajectory. Thus, it is possible to increase the amount of information that can be inputted by the movement of a hand, by adding a direction to the trajectory. According to a further specific feature, the display controller can cause the display screen to display a plurality of instructions in different directions of a movement of a hand to be moved, in association with a plurality of inputted meanings.

According to another specific feature, the display controller does not display an instruction when no determination is being made by the determination unit. It is thereby possible to provide a mobile device which is user-friendly, which prevents confusion such as guiding a useless movement of the hand which will not contribute to any determination.

According to another feature, there is provided a mobile device having: a display screen; and a display controller for causing the display screen to display different instructions between cases of right-handed operation and left-handed operation relative to the input of a like meaning on the display screen.

The above feature makes it possible to input a like meaning with a natural movement of each of the right hand and left hand, without forcing an unnatural movement such as where a right hand is moved parallel to the left hand symmetrical thereto, when a like meaning is being inputted with a single hand holding the mobile device.

According to a specific feature, the display controller causes the display screen to display instructions arranged in bilateral symmetry between cases of right-handed operation and left-handed operation. It is thereby possible to input a like meaning by a natural movement of each of the right hand and left hand, which are in a mutually symmetrical relationship. For example, in the case of using the thumb to operate, a natural operation is possible from the right hand thumb, which is on the right side when the hand is flat, in the case where the device is held in the right hand, and from the left hand thumb, which is on the left side when the hand is flat, in the case where the device is held in the left hand.

According to another specific feature, there is a movement detector for detecting the movement of a hand being moved over the display screen, where the display controller causes the display screen to display different instructions between the case of right-handed operation and the case of left-handed operation, on the basis of the detection of the movement detector. A switch is thereby readily made between the right-handed operation state and the left-handed operation state, on the basis of the actual movement of the right hand or left hand.

According to another specific feature, there is an acceleration detection unit for detecting acceleration relative to the device, where the display controller causes the display screen to display different instructions between the case of right-handed operation and the case of left-handed operation, on the basis of the detection of the acceleration detection unit. It is thereby possible to use hand motion to rapidly and readily switch between the right-handed operation state and the left-handed operation state even without enlisting the other hand, by tapping or otherwise interacting with the cellular telephone with the thumb during single-handed operation.

According to another feature, there is provided a mobile device characterized by comprising: a display screen; a movement detector for detecting the movement of a hand being moved over a display screen; and an input unit for inputting a like meaning on the basis of the output of the movement detector, which is different between the case of a right-handed operation and the case of a left-handed operation. It is thereby possible to process, as a like meaning, whenever input is performed with a movement such that there is mutual symmetry between the right hand and the left hand.

According to a specific feature, the movement detector has an infrared-light-emitting unit, and an infrared-light-receiving unit for receiving the infrared light of the infrared-light-emitting unit reflected from a hand being moved over the display screen, where the input unit changes the intensity of the emitted light of the infrared-light-emitting unit between the case of right-handed operation and the case of left-handed operation. It is thereby possible to obtain suitable output of reflected infrared light in all cases whenever input is performed with a movement such that there is mutual symmetry between the right hand and the left hand.

According to another feature, there is provided a mobile device having: a display screen; a movement detector for detecting the movement of a hand being moved over the display screen; and a determination unit for determining the detection results of the detection unit to be the input of a like meaning on the basis of determination criteria which are different between the case of right-handed operation and the case of left-handed operation. Thereby, even when the detection results of the detector are different as a result of there having been input with a movement such that there is mutual symmetry between the right hand and the left hand, the same can be processed as the input of a like meaning.

According to another feature, there are provided: a display screen; an input unit; a camera unit for capturing images of a direction facing opposite the display screen; a facial recognition unit for processing an image of the camera unit to recognize a face; and a mobile device in which input is performed using the input unit when a face facing opposite the display screen is recognized by the facial recognition unit.

Ordinarily, when an input operation is performed, the operator is viewing the display screen, and, as a result, an image of the face of the operator is captured by the camera unit for capturing an image of the direction facing opposite the display screen. Therefore, according to the above feature, inputting is performed using the input unit once the face of the operator viewing the display screen has been detected; therefore, it is possible to prevent instances where mistaken input is the response, and a mistaken input is made in a state where the face of the operator is not over the display screen.

According to a specific feature, the input unit is characterized by having a movement detector for detecting the movement of a hand being moved over the display screen. It is thereby possible to prevent mistaken input in such cases as where a hand or the like unintentionally crosses over the display screen when no operation is intended.

As described above, according to the third technical feature disclosed in the present specification, there can be provided a mobile device in which input is readily performed.

INDUSTRIAL APPLICABILITY

The present invention provides a user-friendly mobile device.

LIST OF REFERENCE SIGNS

4 . . . Display screen
6, 8, 10, 12 . . . Movement detector, non-contact input unit
36 . . . Display controller
36 . . . Determination unit
8, 10, 12 . . . Infrared-light-emitting unit
6 . . . Infrared-light-receiving unit
13 . . . Camera
36 . . . Facial recognition unit
44 . . . Acceleration detection unit
36 . . . Input unit
6, 12, 35, 36, 37, 42 . . . State identification unit
36 . . . Power supply controller
12, 35 . . . Light-emitting unit
6, 37, 42 . . . Light-receiving unit 35, 37, 42 . . . Back surface light-emitting and light-receiving unit
6, 12 . . . Front surface light-receiving and light-emitting unit
42 . . . Camera unit
49 . . . Contact detector
36, 40 . . . Updating means

The invention claimed is:

1. A mobile device comprising:
   an acceleration detector arranged to detect gravitation acceleration;
   a display screen arranged to display an indication;
   a controller arranged to control the display to move the indication on the display in response to a change in the gravitation acceleration detected by the acceleration detector; and
   a reference value setter arranged to replace a reference value of gravitation acceleration detection necessary for a former input by a new reference value of gravitation acceleration detection necessary for a new input,
   wherein the reference value setter is arranged to replace the reference value in response to the acceleration detector when it is determined that the mobile device has come to a stop with no acceleration being detected for a predetermined period of time.

2. The mobile device according to claim 1, wherein the controller is further arranged to determine a direction to move the indication in dependence on whether the display screen faces up or down.

3. The mobile device according to claim 2, wherein the controller is arranged to move the indication from up to down when, in the case where the display is facing up, an upper side of the mobile device is lifted relatively higher.

4. The mobile device according to claim 2, wherein the controller is arranged to move the indication from down to up when, in the case where the display is facing down, an upper side of the mobile device is lifted relatively higher.

5. The mobile device according to claim 1 further comprising a movement detector for detecting a movement of a finger being moved on the display screen, wherein the reference value setter is arranged to replace the reference value in response to the movement detector.

6. The mobile device according to claim 1 wherein the controller is arranged to control the display to move the indication on the display in response to a relative change in the gravitation acceleration detected by the acceleration detector.

7. A mobile device comprising:
   an acceleration detector for detecting gravitation acceleration;
   a display screen;
   a controller arranged to control the display in response to a relative change in the gravitation acceleration detected by the acceleration detector; and
   a reference value setter arranged to replace a reference value of gravitation acceleration detection necessary for a former input by a new reference value of gravitation acceleration detection necessary for a new input,
   wherein the reference value setter is arranged to replace the reference value in response to the acceleration detector when it is determined that the mobile device has come to a stop with no acceleration being detected for a predetermined period of time.

8. The mobile device according to claim 7, wherein the controller is further arranged to control the display in dependence on whether the display screen faces up or down.

9. The mobile device according to claim 8, wherein the controller is arranged control the display differently depending on whether the display is facing up or down with an upper side of the mobile device lifted relatively higher.

10. The mobile device according to claim 8, wherein the controller is arranged control the display differently depending on whether the display is facing up or down with a lower side of the mobile device lifted relatively higher.

11. The mobile device according to claim 7 further comprising a movement detector for detecting a movement of a finger being moved on the display screen, wherein the reference value setter is arranged to replace the reference value in response to the movement detector.

12. A mobile device comprising:
   an acceleration detector for detecting gravitation acceleration;
   a reference value setter arranged to replace a reference value of gravitation acceleration detection necessary for a former input by a new reference value of gravitation acceleration detection necessary for a new input;
   a controller arranged to control the mobile device in response to a relative change in the gravitation acceleration detected by the acceleration detection unit compared with the reference value,
   wherein the reference value setter is arranged to replace the reference value in response to the acceleration detection unit when it is determined that the mobile device has come to a stop with no acceleration being detected for a predetermined period of time.

13. The mobile device according to claim 12 further comprising a movement detector for detecting a movement of a finger being moved on the display screen, wherein the reference value setter is arranged to replace the reference value in response to the movement detector.

14. The mobile device according to claim 12 further comprising a storage arranged to store the reference value, wherein the reference value setter is arranged to replace the reverence value store in the storage.

15. The mobile device according to claim 12, wherein the controller includes a comparator arranged to compare the gravitation acceleration with the reference value.

* * * * *